(12) United States Patent
Szala et al.

(10) Patent No.: US 11,555,104 B2
(45) Date of Patent: Jan. 17, 2023

(54) POLYOLEFIN COMPOSITIONS, ARTICLES THEREOF, AND METHODS THEREOF

(71) Applicant: ExxonMobil Chemical Patents Inc., Baytown, TX (US)

(72) Inventors: Caroline N. Szala, Brussels (BE); Martin Machado, Brussels (BE); Michael Martin-Gatius, Brussels (BE); Joachim F. Laun, Vlaams-Brabant (BE); Linda M. van den Bossche, Zwijndrecht (BE)

(73) Assignee: EXXONMOBIL CHEMICALS PATENTS INC., Baytown, TX (US)

( * ) Notice: Subject to any disclaimer, the term of this patent is extended or adjusted under 35 U.S.C. 154(b) by 315 days.

(21) Appl. No.: 16/829,748

(22) Filed: Mar. 25, 2020

(65) Prior Publication Data

US 2020/0317896 A1    Oct. 8, 2020

Related U.S. Application Data

(60) Provisional application No. 62/830,886, filed on Apr. 8, 2019.

(51) Int. Cl.
| | |
|---|---|
| *C08L 23/12* | (2006.01) |
| *C08L 23/08* | (2006.01) |
| *C08L 23/06* | (2006.01) |
| *C08L 29/04* | (2006.01) |
| *C08L 77/00* | (2006.01) |

(Continued)

(52) U.S. Cl.
CPC .............. *C08L 23/12* (2013.01); *C08L 23/06* (2013.01); *C08L 23/0853* (2013.01); *C08L 23/0869* (2013.01); *C08L 29/04* (2013.01); *C08L 33/08* (2013.01); *C08L 51/003* (2013.01);
(Continued)

(58) Field of Classification Search
CPC ........ C08L 23/06; C08L 77/02; C08L 51/003; C08L 29/04; C08L 23/0861
See application file for complete search history.

(56) References Cited

U.S. PATENT DOCUMENTS 4,444,817 A * 4/1984 Subramanian .......... C08L 23/06
                                                    428/394
6,884,850 B2   4/2005 Schauder et al.
(Continued)

FOREIGN PATENT DOCUMENTS

EP       3400199 A    7/2016
WO    2010/034456 A    4/2010
(Continued)

*Primary Examiner* — Mark S Kaucher

(57) ABSTRACT

The present disclosure relates to polymer compositions, articles formed from polymer compositions, methods of making polymer compositions, and methods of making articles including polymer compositions. In at least one embodiment, a composition includes: (1) an ethylene polymer, (2) a vinyl alcohol polymer or a polyamide, and (3) a polar polymer or a grafted polyolefin. A composition of the present disclosure may further include a polypropylene polymer. A polar polymer may be an ethylene-acrylic-acid-copolymer, ethylene acrylate copolymer, a polyvinyl acetate, or combination(s) thereof. In at least one embodiment, a film includes a composition having: (1) an ethylene polymer, (2) a vinyl alcohol polymer or a polyamide, and (3) a polar polymer or a grafted polyolefin.

30 Claims, 1 Drawing Sheet

(51) Int. Cl.
*C08L 33/08* (2006.01)
*C08L 51/00* (2006.01)

(52) U.S. Cl.
CPC ........... *C08L 77/00* (2013.01); *C08L 2205/02* (2013.01); *C08L 2205/035* (2013.01); *C08L 2207/062* (2013.01)

(56) References Cited

U.S. PATENT DOCUMENTS

| | | |
|---|---|---|
| 7,282,541 B2 | 10/2007 | Schauder et al. |
| 7,439,307 B2 | 10/2008 | Schauder et al. |
| 2005/0131147 A1* | 6/2005 | Brule ................... B82Y 30/00 |
| | | 525/178 |
| 2008/0032148 A1 | 2/2008 | Lee et al. |
| 2017/0183426 A1* | 6/2017 | Kawai ..................... C08K 3/36 |
| 2017/0321038 A1* | 11/2017 | Hou ......................... B29B 9/06 |
| 2018/0237598 A1* | 8/2018 | Guo ......................... C08J 5/043 |

FOREIGN PATENT DOCUMENTS

| | | |
|---|---|---|
| WO | 2014/070237 A | 5/2014 |
| WO | 2017/021389 A | 2/2017 |

\* cited by examiner

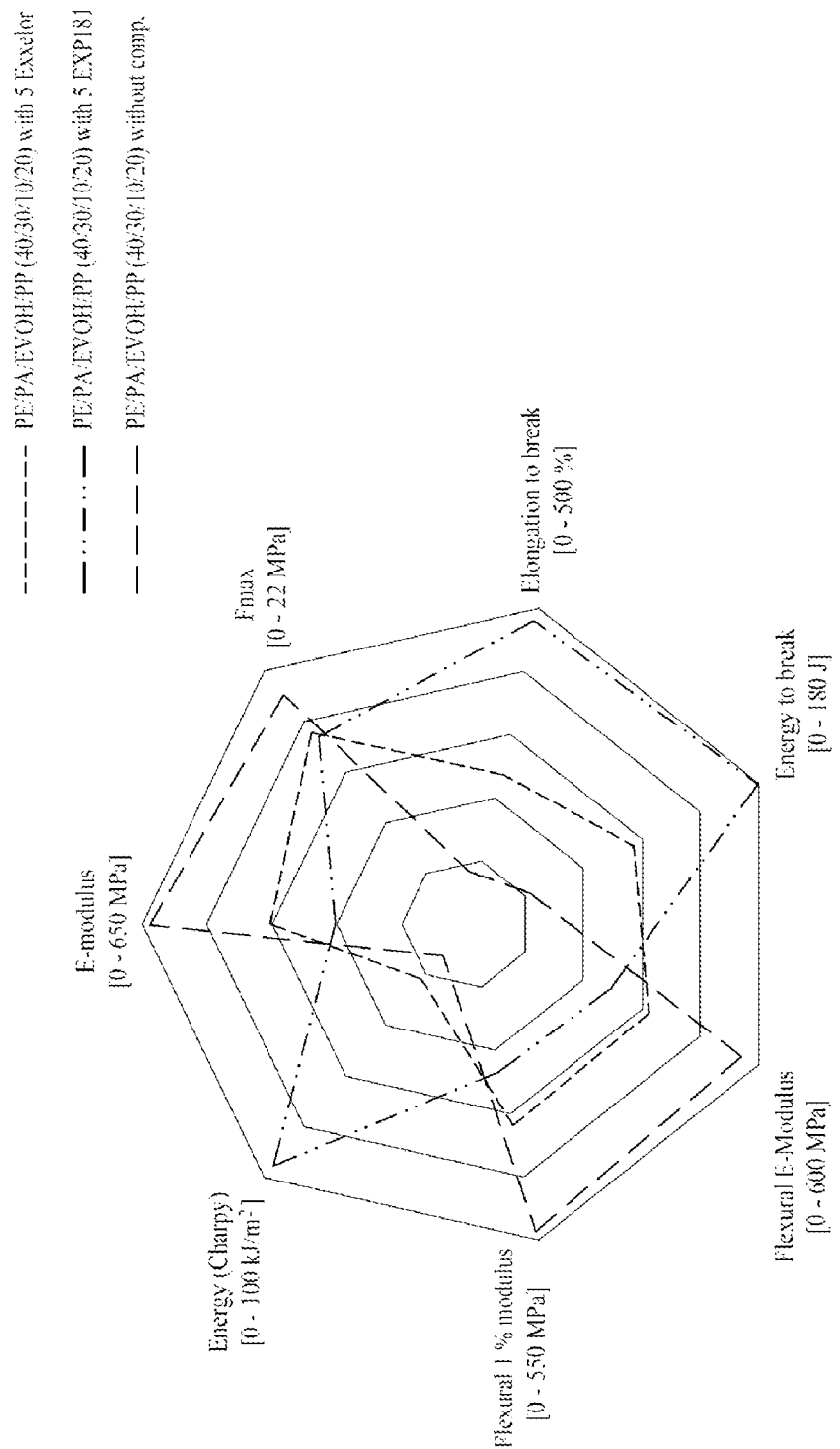

POLYOLEFIN COMPOSITIONS, ARTICLES THEREOF, AND METHODS THEREOF

CROSS-REFERENCE TO RELATED APPLICATIONS

This application claims priority to U.S. Ser. No. 62/830,886, filed Apr. 8, 2019, herein incorporated by reference.

FIELD

The present disclosure relates to polymer compositions, articles formed from polymer compositions, methods of making polymer compositions, and methods of making articles including polymer compositions.

BACKGROUND

The supply chain in post-consumer recycle (PCR) products is quite complex and includes several parties which may collect, separate, de-label, grind, wash, re-separate, compound and finally sell to a customer who will fabricate the plastic part. In addition, many consumer goods, such as food packaging, include complex polymer structures such as barrier film structures made from multilayers that are typically made from different polymers such as polyethylenes (PEs), polyamides (PAs), and ethylene vinyl alcohols (EVOHs). Because of the differing chemical and physical parameters of these polymers, attempts to form recycled materials from these barrier films have not been met with success. For example, PE and PA, EVOH are not miscible and phase-separate when mixed in a blend. This phase separation provides fragile interfaces between these polymer components of the blend which leads to poor mechanical properties if the blend were used as a recycle stream. In addition, polymer components of the PE, PA, and/or EVOH blends are difficult to separate from one another, particularly on an industrial scale. Consequently, instead of recycling the blend, a considerable amount of packaging barrier film, for example, is disposed by landfill or incineration.

Impact modifiers or compatibilizers (typically low viscosity compatibilizers) may be added to a blend to increase properties specified by the industry. It is not uncommon to see anywhere from one to ten different modifiers added to the final product before being sold to the fabricator. Once the customer is ready to fabricate the plastic part, they also may add extra modifiers as needed. Addition of modifiers typically increases the total formulation cost. Furthermore, many modifiers might be needed to achieve the desired properties combination.

There is a need for compositions and articles (e.g., films) having enhanced mechanical properties and optical properties, as well as methods for forming such compositions and articles thereof.

References for citing in an Information Disclosure Statement (37 C.F.R. 1.97(h)): U.S. Pat. Nos. 6,884,850; 7,282,541; 7,439,307; European Patent No. EP3040199; PCT Publication No. WO 2010/034456 A1.

SUMMARY

The present disclosure relates to polymer compositions, articles formed from polymer compositions, methods of making polymer compositions, and methods of making articles including polymer compositions.

In at least one embodiment, a composition includes an ethylene polymer, a vinyl alcohol polymer or polyamide, and a polar polymer or a grafted polyolefin.

In at least one embodiment, a film includes a composition having an ethylene polymer, a vinyl alcohol polymer or polyamide, and a polar polymer or a grafted polyolefin.

BRIEF DESCRIPTION OF THE DRAWING

FIG. 1 is a radar plot of measured injection molding features for products comprising compositions of the present disclosure as compared to a comparative polymer, according to an embodiment.

DETAILED DESCRIPTION

Before the present compounds, components, compositions, and/or methods are disclosed and described, it is to be understood that unless otherwise indicated the present disclosure is not limited to specific compounds, components, compositions, reactants, reaction conditions, ligands, metallocene structures, catalyst structures, or the like, as such may vary, unless otherwise specified. It is also to be understood that the terminology used herein is for the purpose of describing particular embodiments only and is not intended to be limiting.

The present disclosure relates to polymer compositions, articles formed from polymer compositions, methods of making polymer compositions, and methods of making articles including polymer compositions. For example, the present disclosure relates to polypropylene-based and polyethylene-based polyolefin compositions which can have improved mechanical properties and optical properties. The present disclosure provides a composition (blend) comprising one or more first polymer (polyethylene), optionally one or more second polymer (polypropylene), one or more grafted polyolefin and/or one or more polar polymer, one or more of a vinyl alcohol and a polyamide, and optionally one or more additional additives which may include non-grafted propylene-based elastomers. Grafted elastomers can be grafted propylene-based elastomer(s) or grafted polyethylene, for example a grafted ethylene-based plastomer or a grafted high-density polyethylene. The grafted polyolefin or polar polymer can be added to the composition at any suitable stage of composition formation (not necessarily as part of a layer of a recycled barrier structure) which provides improved mechanical properties of the recycled material when formed into an article (such as a film).

In some embodiments, compositions and methods described herein relate to recycled polyolefin resins improvement using the polar polymers or the grafted polyolefinic elastomers such as grafted VISTAMAXX™ (from Exxonmobil Chemical Company), and processes of forming such. In at least one embodiment, through the addition of a low level of one or more polar polymers or grafted polyolefins such as grafted VISTAMAXX™ into the polymer blend, final end properties such as flow modification, impact, haze and clarity can be enhanced for both polypropylene and polyethylene-rich post-consumer recycle materials. Without being bound by theory, it is believed that a polar polymer or a grafted polyolefin provides an increase in interfacial bonding strength between PE and PA/EVOH domains in a composition because the grafted polyolefin and the polar polymer can adhere to both materials at the interface of the PE and PA/EVOH. The increased interfacial bonding provides reduced surface energy between the PE/PA/EVOH domains which provides better dispersion of the domains and smaller domain size, which in turn provides improved mechanical and/or optical properties to materials formed from the composition, as compared to conventional PE/PA/EVOH blends.

As used herein, a "composition" can include the components (such as a polyethylene, a polypropylene, a grafted polyolefin, and/or a polar polymer) as well as contact products of the components and/or reaction products of the components.

For the purposes of the present disclosure, ethylene shall be considered an alpha-olefin.

For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units.

As used herein, "polymer" may refer to homopolymers, copolymers, interpolymers, terpolymers, etc. A "polymer" has two or more of the same or different monomer units. A "homopolymer" is a polymer having monomer units that are the same. A "copolymer" is a polymer having two or more monomer units that are different from each other. A "terpolymer" is a polymer having three monomer units that are different from each other. The term "different" as used to refer to monomer units indicates that the monomer units differ from each other by at least one atom or are different isomerically. Accordingly, the definition of copolymer, as used herein, includes terpolymers and the like. Likewise, the definition of polymer, as used herein, includes copolymers and the like. Thus, as used herein, the terms "polyethylene," "ethylene polymer," and "ethylene-based polymer" mean a polymer or copolymer comprising at least 50 mol % ethylene units (such as at least 70 mol % ethylene units, such as at least 80 mol % ethylene units, such as at least 90 mol % ethylene units, such as at least 95 mol % ethylene units or 100 mol % ethylene units (in the case of a homopolymer)).

As used herein, when a polymer is referred to as comprising a monomer, the monomer is present in the polymer in the polymerized form of the monomer or in the derivative form of the monomer. When a polymer is said to comprise a certain percentage, wt %, of a monomer, that percentage of monomer is based on the total amount of monomer units in the polymer.

As used herein, "polyolefin" refers to a polymer having two or more olefin monomers that are the same or different. For example, the monomers can be ethylene, propylene, a C4-C20 alpha-olefin, or mixture(s) thereof.

As used herein, "elastomer" or "elastomer composition" refers to any polymer or composition of polymers (such as blends of polymers) consistent with the ASTM D1566 definition. Elastomer includes mixed blends of polymers such as melt mixing and/or reactor blends of polymers.

As used herein, "first" polymer and "second" polymer are merely identifiers used for convenience, and shall not be construed as limitation on individual ethylene copolymer, their relative order, or the number of ethylene copolymers used, unless otherwise specified herein.

Grafted Polyolefins

Compositions of the present disclosure can include one or more grafted polyolefins. A grafted polyolefin of the present disclosure can be a grafted propylene-based elastomer (as described in more detail below).

Additionally or alternatively, grafted polyolefins can be or include a grafted ethylene-based plastomer and/or a grafted high-density polyethylene. For example, a composition can include a grafted propylene-based elastomer and grafted ethylene-based plastomer. In at least one embodiment, a grafted ethylene-based plastomer (as described in more detail below) has at least one of the following properties: a density of from about 0.86 g/cm$^3$ to about 0.90 g/cm$^3$, a melt index of from about 1 g/10 min to about 22 g/10 min (230° C., 5.0 kg) (such as about 1 g/10 min to about 5 g/10 min, such as from about 6 g/10 min to about 12 g/10 min, such as from about 14 g/10 min to about 22 g/10 min), and/or a grafting level (e.g., MAH) of from about 0.2 wt % to about 1 wt %.

Additionally or alternatively, a composition can include a grafted propylene-based elastomer and/or a grafted high-density polyethylene (as described in more detail below). In at least one embodiment, a grafted high-density polyethylene has one or more of the following properties: a density of from about 0.95 g/cm$^3$ to about 0.97 g/cm$^3$, an MFR (190° C., 5.0 kg) of from about 1.5 g/10 min to about 6.5 g/10 min, and/or a grafting level of from about 0.1 wt % to about 0.9 wt %.

Additionally or alternatively, a composition can include a grafted propylene-based elastomer and/or a grafted polypropylene copolymer. In at least one embodiment, a grafted polypropylene copolymer has one or more of the following properties: a density of from about 0.89 g/cm$^3$ to about 0.91 g/cm$^3$, an MFR (190° C., 1.2 kg) of from about 17 g/10 min to about 27 g/10 min, and/or a grafting level of from about 0.2 wt % to about 0.5 wt %. In at least one embodiment, a grafted propylene-based copolymer is Exxelor™ PO1015 which has a density of about 0.9 g/cm$^3$, an MFR (190° C., 1.20 kg) of about 22 g/10 min, and an MAH level of from about 0.25 wt % to about 0.5 wt %.

Additionally or alternatively, a composition can include a grafted propylene-based elastomer and/or a grafted polypropylene homopolymer. In at least one embodiment, a grafted polypropylene homopolymer has one or more of the following properties: a density of from about 0.89 g/cm$^3$ to about 0.91 g/cm$^3$, an MFR (190° C., 1.2 kg) of from about 80 g/10 min to about 170 g/10 min, and/or a grafting level of from about 0.5 wt % to about 1 wt %. In at least one embodiment, a grafted propylene-based homopolymer is Exxelor™ PO1020 which has a density of about 0.9 g/cm$^3$, an MFR (190° C., 1.20 kg) of from about 80 g/10 min to about 170 g/10 min, and an MAH level of from about 0.5 wt % to about 1.0 wt %.

Grafted Propylene-Based Elastomers

Compositions of the present disclosure can include one or more grafted propylene-based elastomers. Propylene-based elastomers having a low ethylene content (e.g., between 8 and 32 mole %), and with predominantly isotactic polypropylene segments (>80% mm triad by $^{13}$C NMR) insuring polypropylene type crystallinity can be grafted with maleic anhydride. Compared to a polypropylene homopolymer, these polymers, comprising low levels of ethylene content, have a higher grafting level when increasing the maleic anhydride feed. This allows the production of maleic anhydride grafted propylene rich copolymers at levels of from about 0.4 wt % to about 1.5 wt %. Grafted propylene-based elastomers have affinity to both polyethylene and other materials of a composition of the present disclosure (which can include a recycled barrier film), improving the composition morphology and the interfacial bonding strength, providing improved mechanical and optical properties of a product formed from a composition of the present disclosure.

Propylene-based elastomers can be grafted with maleic anhydride in a single stage in the presence of a peroxide initiator. The copolymer starting materials comprise an ethylene content from about 8 to 32 mole %, such as from about 10 to about 27 mole % ethylene, such as from about 14 to 21 mole % ethylene. Propylene-based elastomers can contain between 92 to 68 mole % of propylene with a predominant (e.g., >80%) of the propylene in isotactic configuration as measured by the mm triad in $^{13}$C NMR. These polymers contain a single hydrocarbon phase unlike the polymers of the prior art of the same composition and tacticity (so called reactor TPO or impact copolymers) which typically consist of at least two distinct phases. In addition, these polymers are very flexible as determined by their values of flexural modulus to be less than 1,000 MPa (such as less than 750 MPa, such as less than 350 MPa), have high elongations under a unidimensional tensile load of greater than 800% and a level of crystallinity much lower than expected for their composition and tacticity of the propylene residues. Polymers of the present disclosure may be made in a polymerization process that comprises a single stage polymerization process.

These propylene-based elastomers comprise isotactic sequences long enough to engender crystallinity. These grafted polymers contain a single hydrocarbon phase unlike the polymers of the prior art of the same composition, grafting level and tacticity (so called grafted reactor copolymers and impact copolymers) which typically consist of at least two distinct phases. In addition and more importantly, these grafted polymers are very flexible as determined by their values of flexural modulus to be less than 350 MPa, have high elongations under a unidimensional tensile load of greater than 800% and a level of crystallinity much lower than expected from the prior art for their composition and tacticity of the propylene residues. The functionality level of the product copolymers is greater than that for similarly grafted propylene homopolymers. The functionality level of the product copolymers increases with the increase in the level of the maleic anhydride feed and can be as much as 1.5 weight %. Furthermore, the higher incorporation of functional groups is accomplished without a lower degree of molecular weight loss as in the case of propylene homopolymers.

In at least one embodiment, a grafted propylene-based elastomer is grafted Vistamaxx™ 6102, which is a propylene-based elastomer having an ethylene content of about 16 wt % and grafted with maleic anhydride with a grafting level of from about 0.4 wt % to about 1.5 wt % maleic anhydride and an MFR of typically about 9 to about 30 g/10 min (190° C./1.2 kg) additionally or alternatively from about 24.9 to about 51.5 g/10 min (190° C., 2.16 kg).

Polymer Component of Grafted Propylene-Based Elastomers

The propylene-based elastomers of this disclosure can be prepared by polymerizing propylene with a C2 or C4-C20 alpha olefin, such as propylene and ethylene in the presence of a chiral metallocene catalyst with an activator and optional scavenger. The comonomer used with propylene may be linear or branched. Exemplary linear alpha-olefins include ethylene or C4 to C8 alpha-olefins, such as ethylene, 1-butene, 1-hexene, and 1-octene, such as ethylene or 1-butene. Exemplary branched alpha-olefins include 4methyl-1-pentene, 3-methyl-1-pentene, and 3,5,5-trimethyl-1-hexene.

Exemplary propylene-based elastomers have an average propylene content on a molar basis of from about 68% to about 92%, such as from about 75% to about 91%, such as from about 78% to about 88%, such as from about 80% to about 88%. The balance of the copolymer is one or more alpha-olefins as specified above and optionally minor amounts of one or more diene monomers.

Preferably, the propylene-based elastomer comprises ethylene as the comonomer in the range of from about 8 to 32 mole %, such as from about 9 to about 25 mole % ethylene, such as from about 12 to about 22 mole % ethylene, such as from about 13 to 20 mole % ethylene.

The use of a chiral metallocene catalyst can provide that the methyl group of the propylene residues have predominantly the same tacticity. Both syndiotactic and isotactic configuration of the propylene are possible though the isotactic polymers are preferred. The tacticity of the propylene residues leads to crystallinity in the polymers. For the polymers of the present disclosure, the low levels of crystallinity in the propylene-based elastomer are derived from isotactic polypropylene obtained by incorporating alpha-olefin comonomers as described above. The semi-crystalline propylene-based elastomer preferably has a heat of fusion from about 0.5 J/g to about 25 J/g, more preferably from about 1 J/g to about 20 J/g, and most preferably from about 1 J/g to about 15 J/g. The crystallinity of the propylene-based elastomer arises predominantly from crystallizable stereoregular propylene sequences. The crystallinity of the propylene-based elastomer can also be expressed in terms of percentage of crystallinity. The thermal energy for the highest order of polypropylene is estimated at 189 J/g. That is, 100% crystallinity is equal to 189 J/g. Therefore, according to the heat of fusion values, the polymer has a polypropylene crystallinity of about 0.25% to about 15%, such as from about 0.5% to about 13%, such as from about 0.5% to about 11%.

The propylene-based elastomer can have a single broad melting transition. Typically a sample of the propylene-based elastomer will show secondary melting peaks adjacent to the principal peak, these are considered together as a single melting point. The highest of these peaks is considered the melting point. The propylene-based elastomer may have a melting point of from about 25° C. to about 75° C., such as from about 25° C. to about 65° C., such as from about 30° C. to about 60° C.

The weight average molecular weight of the propylene-based elastomer can be from about 10,000 to about 5,000,000 g/mol, such as about 80,000 g/mol to about 500,000 g/mol with a MWD (Mw/Mn) between 1.5 to 40.0, such as from about 1.8 to 5, such as from about 1.8 to about 3. In another embodiment, it is preferred if the propylene-based elastomer has a Mooney viscosity ML (1+4)@125° C. less than 100, such as less than 75, such as less than 60, such as less than 30.

A propylene-based elastomer of the present disclosure can include a random crystallizable copolymer having a narrow compositional distribution. The intermolecular composition distribution of the polymer is determined by thermal fractionation in a solvent. A typical solvent is a saturated hydrocarbon such as hexane or heptane. Typically, approximately 75% by weight and more preferably 85% by weight of the polymer is isolated as one or two adjacent, soluble fraction with the balance of the polymer in immediately preceding or succeeding fractions. Each of these fractions has a composition (wt. % ethylene content) with a difference of no greater than 20% (relative) and more preferably 10% (relative) of the average weight % ethylene content of the propylene-based elastomer. The propylene-based elastomer has a narrow compositional distribution if it meets the fractionation test criteria outlined above.

The length and distribution of stereoregular propylene sequences in preferred propylene-based elastomers is consistent with substantially random statistical copolymerization. It is well known that sequence length and distribution are related to the copolymerization reactivity ratios. By substantially random, we mean copolymer for which the product of the reactivity ratios is generally 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer may be determined by $^{13}C$ NMR, which locates the ethylene residues in relation to the neighboring propylene residues. To produce a crystallizable copolymer with the required randomness and narrow composition distribution, it is desirable to use (1) a single sited catalyst and (2) a well-mixed, continuous flow stirred tank polymerization reactor which allows only a single polymerization environment for substantially all of the polymer chains of preferred propylene-based elastomer. Propylene-based elastomers of such embodiments are prepared by polymerizing propylene and at least one C2 or C4-C20 alpha olefin in the presence of a chiral metallocene catalyst with an activator and optional scavenger, such as ethylene and propylene. Preferred chiral metallocenes are those known to favor incorporation of propylene for the production of predominantly isotactic polypropylene pentads and statistically random incorporation of the alpha-olefin comonomer(s). The term "metallocene" and "metallocene catalyst precursor" are terms known in the art to mean compounds possessing a Group IV, V, or VI transition metal M, with a cyclopentadienyl (Cp) ligand or ligands which may be may be substituted, at least one non-cyclopentadienyl-derived ligand X, and zero or one heteroatom-containing ligand Y, the ligands being coordinated to M and corresponding in number to the valence thereof. The metallocene catalyst precursors generally require activation with a suitable co-catalyst (referred to as activator) in order to yield an active metallocene catalyst which refers generally to an organometallic complex with a vacant coordination site that can coordinate, insert, and polymerize olefins.

Exemplary metallocenes are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula: $(Cp^1R^1{}_m)R^3{}_n(Cp^2R^2{}_p)MX_q$ wherein $Cp^1$ of ligand $(Cp^1R^1{}_m)$ and $Cp^2$ of ligand $(Cp^2R^2{}_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to 20 carbon atoms, m is preferably 1 to 5, p is preferably 1 to 5, and two $R^1$ and $R^2$ substituents on adjacent carbon atoms of the cyclopentadienyl ring associated there may be joined together to form a ring containing from 4 to 20 carbon atoms, $R^3$ is a bridging group, n is the number of atoms in the direct chain between the two ligands and is preferably 1 to 8, such as 1 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, q is equal to the valence of M minus 2.

Numerous examples of the biscyclopentadienyl metallocenes described above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; 5,304,614; 6,884,850; 7,282,541; and 7,439,307, all of which are incorporated by reference for purposes of U.S. patent practice.

A preferred propylene-based elastomer used in the present disclosure is described in detail as the "Second Polymer Component (SPC)" in U.S. Ser. No. 60/133,966, filed May 13, 1999, and U.S. Ser. No. 60/342,854, filed Jun. 29, 1999, which are both fully incorporated by reference herein for purposes of U.S. practice.

In addition to one or more comonomers making up the major portion of the polymer (i.e., alpha-olefins) selected such as, but not limited to, ethylene, alpha-olefins having 4 to 8 carbon atoms, and styrenes, the propylene-based elastomers, as described above can optionally contain long chain branches. These can optionally be generated using one or more alpha-omega dienes. Alternatively, the soft polymer component may contain small quantities of at least one diene, and such as at least one of the dienes is a non-conjugated diene to aid in the vulcanization and other chemical modification. The amount of diene might be no greater than about 10 wt %, such as no greater than about 5 wt %. The diene may be selected from the group consisting of those that are used for the vulcanization of ethylene propylene rubbers, such as ethylidene norbornene, vinyl norbornene, dicyclopentadiene, and 1,4-hexadiene (available from DuPont Chemicals).

In another embodiment, the polymer component can be a blend of discrete polymers. Such blends can be of two or more polyethylene copolymers (as described above), two or more propylene-based elastomers (as described above), or at least one of each such polyethylene copolymer and propylene-based elastomer, where each of the components of the polymer blend would individually qualify as a polymer component.

In some embodiments, the polymer components of the propylene-based elastomers differ in the alpha-olefin content with one being from 7 to 14 mole % olefin while the other is in the range of 14 to 22 mole % olefin. The preferred olefin is ethylene. It is believed that the use of two-polymer components leads to beneficial improvements in the tensile-elongation properties of the blends.

The propylene-based elastomers have unique properties as evidenced by the relationship of their isotactic index and propylene triad tacticity to their ethylene content.

Propylene-based elastomers of the present disclosure can have a density of from about 0.83 $g/cm^3$ to about 0.92 $g/cm^3$, such as from about 0.85 $g/cm^3$ to about 0.9 $g/cm^3$, such as from about 0.855 $g/cm^3$ to about 0.875 $g/cm^3$, according to ASTM D1505.

Propylene-based elastomers of the present disclosure can have a melt index of from about 0.5 g/10 min to about 21 g/10 min, such as from about 0.5 g/10 min to about 2 g/10 min, alternatively from about 5 g/10 min to about 10 g/min, according to ASTM D1238 (190° C., 2.16 kg).

Propylene-based elastomers of the present disclosure can have a weight average molecular weight of from about 50,000 g/mol to about 300,000 g/mol, such as from about 100,000 g/mol to about 200,000 g/mol, such as from about 100,000 g/mol to about 150,000 g/mol, as determined using GPC.

Propylene-based elastomers of the present disclosure can have a melting point (measured by DSC) of from about 50° C. to about 120° C., such as from about 60° C. to about 105° C., such as from about 80° C. to about 100° C., alternatively from about 60° C. to about 75° C.

Propylene-based elastomers of the present disclosure can have a melt enthalpy (measured by DSC) of from about 1 J/g to about 50 J/g, such as from about 5 J/g to about 15 J/g, such as from about 5 J/g to about 8 J/g.

Propylene-based elastomers of the present disclosure can have a melt flow rate of from about 1 g/min to about 70 g/min, such as from about 1 g/min to about 10 g/min, such as from about 1 g/min to about 5 g/min, alternatively from about 20 g/min to about 5 g/min, per ASTM D1238 (230° C.; 2.16 kg).

Copolymers of the present disclosure can be blended with processing oil and other additives such as nucleating agents, antioxidants, fillers, etc.

In at least one embodiment, VISTAMAXX™ is used as the propylene-based elastomer, such as, Vistamaxx™ 3020, Vistamaxx™ 6102, Vistamaxx™ 6202 and VISTAMAXX™ 6502. VISTAMAXX™ propylene-based elastomers are copolymers of propylene and ethylene. VISTAMAXX™ are propylene rich (>80%) and are semi-crystalline materials with high amorphous content. Their synthesis is based on ExxonMobil Chemical Company's EXXPOL™ technology.

VISTAMAXX™ 3020 propylene-ethylene performance polymer ("VM3020") is available from ExxonMobil Chemical Company. VM3020 has an ethylene content of 11 wt % with the balance being propylene. Typical properties of VM3020 include: a density of 0.874 g/cm$^3$ (ASTM D1505); a melt index of 1.2 g/10 min (ASTM D1238; 190° C., 2.16 kg); a melt mass flow rate of 3 g/10 min (230° C., 2.16 kg); a Shore D hardness of 29 (ASTM D2240); and a Vicat softening temperature (VST) of 67° C.

VISTAMAXX™ 6102 propylene-ethylene performance polymer ("VM6102") is available from ExxonMobil Chemical Company. VM6102 has an ethylene content of 16 wt % with the balance being propylene. Typical properties of VM6102 include: a density of 0.862 g/cm$^3$ (ASTM D1505); a melt index of 1.4 g/10 min (ASTM D1238; 190° C., 2.16 kg); a melt mass flow rate of 3 g/10 min (230° C., 2.16 kg); a Shore A hardness of 67 (ASTM D2240); and a Vicat softening temperature of 52.2° C. (ASTM D1525).

VISTAMAXX™ 6202 propylene-ethylene performance polymer ("VM6202") is available from ExxonMobil Chemical Company. VM6202 has an ethylene content of 15 wt % with the balance being propylene. Typical properties of VM6202 include: a density of 0.862 g/cm$^3$ (ASTM D1505); a melt index of 9.1 g/10 min (ASTM D1238; 190° C., 2.16 kg); a melt mass flow rate of 20 g/10 min (230° C., 2.16 kg); a Shore A hardness of 64 (ASTM D2240); and a Vicat softening temperature of 45.2° C. VM6202 is an essentially amorphous HMW SSC-PP copolymer having a weight average molecular weight (Mw) of about 144,700 g/mol, a DSC melting point of about 108° C., a DSC melt enthalpy of about 6.8 J/g.

VISTAMAXX™ 6502 propylene-ethylene performance polymer ("VM6502") is available from Exxonmobil Chemical Company, Houston, Tex. VM6502 is an amorphous HMW SSC-PP copolymer containing about 13% by weight of ethylene comonomer and having a weight average molecular weight (Mw) of about 119,000 g/mol, a DSC melting point of about 64° C., a DSC melt enthalpy of about 9 J/g, a density of about 0.865 g/cm$^3$ at 23° C. per ASTM D1505, and a melt flow rate of about 45 g/10 min per ASTM D1238 at 230° C./2.16 kg test conditions.

Properties of Grafted Propylene-Based Elastomers

Grafted propylene-based elastomers of the present disclosure can have a melt flow rate of from about 20 g/min to about 60 g/min, such as from about 20 g/min to about 50 g/min, such as from about 25 g/min to about 35 g/min, such as from about 25 g/min to about 45 g/min, per ASTM D1505 (190° C.; 2.16 kg).

Ethylene content of the copolymers of the present invention, either grafted or ungrafted can be measured according to the following technique. A thin homogeneous film of polymer, pressed at temperature about or greater than 150° C. can be mounted on a Perkin Elmer PE 1760 infrared spectrophotometer. A full spectrum of the sample 600 cm$^{-1}$ to 4000 cm$^{-1}$ can be recorded and the ethylene content in wt % can be calculated according to the equation 1.

$$\text{Ethylene, wt \%} = 82.585 - 111.987\, X + 30.045\, X^2 \quad \text{(eq. 1)}$$

where X is the ratio of the peak height at 1155 cm$^{-1}$ and peak height either at 722 cm$^{-1}$ or 732 cm$^{-1}$, whichever is higher.

The maleic anhydride content of the grafted polymers can be determined according to the following procedure. A sample of grafted polymer is first purified from residual monomer by complete solubilization in xylene followed by re-precipitation in acetone. This precipitated polymer is then dried.

0.5 to 1 gram of re-precipitated polymer is dissolved in 150 ml of xylene and a few drops of water are added. The solution is heated at xylene reflux for 1 h and a few drops of a 1% thymol blue solution in DMF are added. The solution is titrated with an excess of 0.025 N potassium hydroxide in ethanol (color change from yellow to blue). The potassium hydroxide excess is than back-titrated with a 0.05 N solution of hydrochloric acid in isopropanol until color changes from blue to yellow. The amount of the potassium hydroxide solution used to neutralize the diacid during the titration is directly proportional to the amount of the graft maleic anhydride present in the polymer.

Techniques for determining the molecular weight (Mn and Mw) and molecular weight distribution (MWD) are found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al) (which is herein incorporated by reference for purposes of U.S. practice) and references cited therein.

The procedure for Differential Scanning calorimetry is described as follows. About 6 to 10 mg of a sheet of the polymer pressed at approximately 200° C. to 230° C. is removed with a punch die. This is annealed at room temperature for 240 hours. At the end of this period, the sample is placed in a Differential Scanning calorimeter (Perkin Elmer 7 Series Thermal Analysis System) and cooled to about −50° C. to about −70° C. The sample is heated at 20° C./min to attain a final temperature of about 200° C. to about 220° C. The thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample. Under these conditions, the melting point of the second polymer component and the heat of fusion is lower than the first polymer component as outlined in the description above.

The stress-strain elongation properties of grafted propylene-based elastomers can be evaluated using dumbbell shaped sample. The samples are compression molded at 180° C. to 200° C. for 15 minutes at a force of 15 tons into a plaque of dimensions of 6 in×6 in. The cooled plaques are removed and the specimens are removed with a die. The stress strain evaluation of the samples can be conducted on an Instron™4465, made by Instron Corporation of 100 Royall Street, Canton, Mass. The digital data can be collected in a file collected by the Series IX Material Testing System available from Instron Corporation and analyzed using Excel 5, a spreadsheet program available from Microsoft Corporation of Redmond, Wash.

Flexural modulus (secant 1%) can be determined according to ASTM D790. Grafted propylene-based elastomers of the present disclosure can have a low flexural modulus, e.g., a 1% secant modulus less than 1400 MPa, such as less than 700 MPa, such as less than 350 MPa. Comparative compositions having similar levels of isotactic crystallinity (as determined by $^{13}$C-NMR) often cannot have flexural modulus less than 1400 MPa.

It is possible to generate comparative polymer compositions with some aspect of the combined 500% tensile modulus and the low flexural modulus of the compositions of this invention if polymers are of extremely high molecular weight and in the limit crosslinked. Such a combination of properties would lead to very poor processing characteristics since they would tend to melt fracture. It is understood that these compositions are directed to easy processing materials which can be handled in conventional thermoplastics processing machinery.

Grafted Polyethylene

Compositions of the present disclosure can include one or more grafted polyethylene. Grafted polyethylenes have affinity to both polyethylene and other materials of a composition of the present disclosure (which can include a recycled barrier film), improving the composition morphology and the interfacial bonding strength, providing improved mechanical and optical properties of a product formed from a composition of the present disclosure.

Grafted polyethylenes can be grafted with maleic anhydride in a single stage in the presence of a peroxide initiator. Grafted polyethylenes of the present disclosure may be made in a polymerization process that comprises a single stage polymerization process.

When grafted, the functionality level of the product copolymers increases with the increase in the level of the maleic anhydride feed and can be, for example, as much as 1.5 weight %.

In at least one embodiment, a grafted ethylene-based plastomer is Exxelor™ VA 1801, which is an ethylene-based plastomer having medium viscosity, outstanding thermal and oxidative stability, high impact resistance, and grafted with maleic anhydride with a grafting level of from about 0.2 wt % to about 0.5 wt % maleic anhydride and an MFR of typically about 9 g/10 min (230° C./10 kg).

In at least one embodiment, a grafted ethylene-based plastomer is Exxelor™ VA1840, which is an ethylene copolymer functionalized with maleic anhydride with a medium grafting level [from 0.2 to 0.5 wt % maleic anhydride] and melt flow rate of typically 8.0 g/10 min (230° C./5.0 kg).

In at least one embodiment, a grafted ethylene-based plastomer is Exxelor™ VA 1803, which is an ethylene-based plastomer having high impact resistance, outstanding thermal and oxidative stability, excellent balance of impact and stiffness, and grafted with maleic anhydride with a grafting level of from about 0.5 wt % to about 1.0 wt % maleic anhydride and an MFR of typically about 3.3 g/10 min (230° C./2.16 kg) and of typically 22 g/10 min (230° C./10 kg).

In at least one embodiment, a grafted ethylene-based plastomer is Exxelor™ PE 1040, which is a high-density polyethylene and grafted with maleic anhydride with a grafting level of from about 0.5 wt % to about 1 wt % maleic anhydride and an MFR of typically about 1 g/10 min (190° C./2.16 kg) and of typically 3 g/10 min (230° C./2.16 kg).

In at least one embodiment, a grafted ethylene-based plastomer is Exxelor™ VA 1202, which is an ethylene-based plastomer having outstanding thermal and oxidative stability, and grafted with maleic anhydride with a grafting level of from about 0.5 wt % to about 1 wt % maleic anhydride and an MFR of typically about 17 g/10 min (230° C./5.0 kg).

Polymer Component of Grafted Ethylene-Based Plastomer

The ethylene-based plastomers of this disclosure can be prepared by polymerizing ethylene with a C3-C20 alpha olefin, such as propylene and ethylene in the presence of a metallocene catalyst with an activator and optional scavenger. The comonomer used with ethylene may be linear or branched. Exemplary linear alpha-olefins include C3 to C8 alpha-olefins, such as propylene, 1-butene, 1-hexene, and 1-octene, such as ethylene or 1-butene. Exemplary branched alpha-olefins include 4methyl-1-pentene, 3-methyl-1-pentene, and 3,5,5-trimethyl-1-hexene.

Exemplary ethylene-based plastomers have an average ethylene content on a molar basis of from about 50% to about 99%, such as from about 51% to about 78%, such as from about 90% to about 99%, such as from about 90% to about 95%. The balance of the copolymer is one or more alpha-olefins as specified above and optionally minor amounts of one or more diene monomers.

Preferably, the ethylene-based plastomers comprises ethylene as the monomer in the range of from about 50 to 99 mole %, such as from about 80 to about 99 mole % ethylene, such as from about 80 to about 95 mole % ethylene, such as from about 85 to 92 mole % ethylene.

The ethylene-based plastomer can have a single broad melting transition. Typically a sample of the ethylene-based plastomer will show secondary melting peaks adjacent to the principal peak, these are considered together as a single melting point. The highest of these peaks is considered the melting point. The ethylene-based plastomer may have a melting point of from about 25° C. to about 105° C., such as from about 55° C. to about 85° C., such as from about 60° C. to about 100° C.

The weight average molecular weight of the ethylene-based plastomer can be from about 10,000 to about 5,000,000 g/mol, such as about 80,000 g/mol to about 500,000 g/mol with a MWD (Mw/Mn) between 1.5 to 40.0, such as from about 1.8 to 5, such as from about 1.8 to about 3. In one or more other embodiments, it is preferred if the ethylene-based plastomer has a Mooney viscosity ML (1+4)@ 125° C. less than 100, such as less than 75, such as less than 60, such as less than 30.

Exemplary metallocenes for forming ethylene-based plastomer are cyclopentadienyl (Cp) complexes which have two Cp ring systems for ligands. The Cp ligands preferably form a bent sandwich complex with the metal and are preferably locked into a rigid configuration through a bridging group. These cyclopentadienyl complexes have the general formula: $(Cp^1R^1{}_m)R^3{}_n(Cp^2R^2{}_p)MX_q$ wherein $Cp^1$ of ligand $(Cp^1R^1{}_m)$ and $Cp^1$ of ligand $(Cp^2R^2{}_p)$ are preferably the same, $R^1$ and $R^2$ each is, independently, a halogen or a hydrocarbyl, halocarbyl, hydrocarbyl-substituted organometalloid or halocarbyl-substituted organometalloid group containing up to 20 carbon atoms, m is preferably 1 to 5, p is preferably 1 to 5, and two $R^1$ and $R^2$ substituents on adjacent carbon atoms of the cyclopentadienyl ring associated there may be joined together to form a ring containing from 4 to 20 carbon atoms, $R^3$ is a bridging group, n is the number of atoms in the direct chain between the two ligands and is preferably 1 to 8, such as 1 to 3, M is a transition metal having a valence of from 3 to 6, preferably from group 4, 5, or 6 of the periodic table of the elements and is preferably in its highest oxidation state, each X is a non-cyclopentadienyl ligand and is, independently, a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, q is equal to the valence of M minus 2.

For more information on the methods and catalysts/activators to produce ethylene-based plastomers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520732; EPA 495 375; EPA 500 944; EPA 570 982; WO91/09882; WO94/03506 and U.S. Pat. No. 5,055,438.

The ethylene-based plastomer have unique properties. Ethylene-based plastomer of the present disclosure can have a density of from about 0.83 g/cm$^3$ to about 0.92 g/cm$^3$, such as from about 0.85 g/cm$^3$ to about 0.9 g/cm$^3$, such as from about 0.855 g/cm$^3$ to about 0.875 g/cm$^3$, according to ASTM D1505.

Ethylene-based plastomer of the present disclosure can have a melt index of from about 0.5 g/10 min to about 15 g/10 min, such as from about 0.5 g/10 min to about 2 g/10 min, alternatively from about 5 g/10 min to about 10 g/min, according to ASTM D1238 (190° C., 2.16 kg).

Ethylene-based plastomers of the present disclosure can have a weight average molecular weight of from about 50,000 g/mol to about 300,000 g/mol, such as from about 100,000 g/mol to about 200,000 g/mol, such as from about 100,000 g/mol to about 150,000 g/mol, as determined using GPC.

Ethylene-based plastomer of the present disclosure can have a melt enthalpy (measured by DSC) of from about 50 J/g to about 150 J/g, such as from about 50 J/g to about 100 J/g, such as from about 100 J/g to about 120 J/g.

Ethylene-based plastomers of the present disclosure can have a melt flow rate of from about 1 g/min to about 70 g/min, such as from about 1 g/min to about 10 g/min, such as from about 1 g/min to about 5 g/min, alternatively from about 20 g/min to about 5 g/min, per ASTM D1238 (230° C.; 2.16 kg).

The Grafting Monomer of Grafted Ethylene-Based Plastomers

The grafting monomer is at least one ethylenically unsaturated carboxylic acid or acid derivative, such as an acid anhydride, ester, salt, amide, imide, or the like. Such monomers include but are not necessary limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophtalic anhydride, norborn-5-ene-2,3-dicarboxylic acid anhydride, nadic anhydride, methyl nadic anhydride, himic anhydride, methyl himic anhydride, and x-methylbicyclo(2.2.1)hept-5-ene-2,3-dicarboxylic acid anhydride (XMNA).

Maleic anhydride is a preferred grafting monomer. As used herein, the term "grafting" denotes bonding (e.g., covalent bonding) of the grafting monomer to a polymer chain of the polymeric composition.

In at least one grafted product of an ethylene-based plastomer and a maleic anhydride grafting monomer, the grafted maleic anhydride concentration can be from about 0.2 wt % to about 6 wt %, such as from about 0.2 wt % to about 2 wt %, such as at least about 0.2 wt %, such as about 1.5 wt %. The MFR of the grafted product can be about 25 g/10 min (at 190° C.) or less, such as 20 or less, such as below 15 g/10 min.

Properties of Grafted Ethylene-Based Plastomers

Grafted ethylene-based plastomers of the present disclosure can have a melt flow rate of from about 0.1 g/min to about 20 g/min, such as from about 0.5 g/min to about 10 g/min, such as from about 0.75 g/min to about 5 g/min, such as from about 0.75 g/min to about 2 g/min, per ASTM D1238 (230° C.; 2.16 kg).

The maleic anhydride content of the grafted polymers can be determined according to the following procedure. A sample of grafted polymer is first purified from residual monomer by complete solubilization in xylene followed by re-precipitation in acetone. This precipitated polymer is then dried.

0.5 to 1 gram of re-precipitated polymer is dissolved in 150 ml of xylene and a few drops of water are added. The solution is heated at xylene reflux for 1 h and a few drops of a 1% thymol blue solution in DMF are added. The solution is titrated with an excess of 0.025 N potassium hydroxide in ethanol (color change from yellow to blue). The potassium hydroxide excess is than back-titrated with a 0.05 N solution of hydrochloric acid in isopropanol until color changes from blue to yellow. The amount of the potassium hydroxide solution used to neutralize the diacid during the titration is directly proportional to the amount of the graft maleic anhydride present in the polymer.

Techniques for determining the molecular weight (Mn and Mw) and molecular weight distribution (MWD) are found in U.S. Pat. No. 4,540,753 (Cozewith, Ju and Verstrate) (which is incorporated by reference herein for purposes of U.S. practices) and references cited therein and in Macromolecules, 1988, volume 21, p 3360 (Verstrate et al) (which is herein incorporated by reference for purposes of U.S. practice) and references cited therein.

The procedure for Differential Scanning calorimetry is described as follows. About 6 to 10 mg of a sheet of the polymer pressed at approximately 200° C. to 230° C. is removed with a punch die. The pressed polymer is cooled (10° C./min) to ambient temperature. The sample is placed in a Differential Scanning calorimeter (Perkin Elmer 7 Series Thermal Analysis System) and cooled to about −50° C. to about −70° C. The sample is heated at 10° C./min to attain a final temperature of about 200° C. to about 220° C. The thermal output, recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample. Under these conditions, the melting point of the second polymer component and the heat of fusion is lower than the first polymer component as outlined in the description above.

The grafted ethylene-based plastomer of the present disclosure can have tensile elongation in excess of 100%, such as in excess of 300%, such as in excess of 500%, such as in excess of 800%. This elongation is determined for the compositions at 50 cm/min according to the procedure described in ASTM D638. For example, a grafted ethylene-based plastomer can have a tensile elongation of from about 500% to about 2,000%, such as from about 800% to about 1,500%, such as from about 1,000% to about 1,500%.

The stress-strain elongation properties of grafted ethylene-based plastomer can be evaluated using dumbbell shaped sample. The samples are compression molded at 180° C. to 200° C. for 15 minutes at a force of 15 tons into a plaque of dimensions of 6 in×6 in. The cooled plaques are removed and the specimens are removed with a die. The stress strain evaluation of the samples can be conducted on an Instron™4465, made by Instron Corporation of 100 Royall Street, Canton, Mass. The digital data can be collected in a file collected by the Series IX Material Testing System available from Instron Corporation and analyzed using Excel 2013, a spreadsheet program available from Microsoft Corporation of Redmond, Wash.

Flexural modulus (secant 1%) can be determined according to ASTM D790. Grafted ethylene-based plastomers of the present disclosure can have a low flexural modulus, e.g., a 1% secant modulus less than 1400 MPa, such as less than 300 MPa, such as less than 200 MPa, such as from about 1 MPa to about 50 MPa, such as about 15 MPa. Comparative compositions having similar levels of isotactic crystallinity (as determined by $^{13}$C-NMR) often cannot have flexural modulus less than 1400 MPa.

Preparing Grafted Polyolefins

The grafted polymeric products may be prepared in solution, in a fluidized bed reactor, or by melt grafting as desired. A particularly preferred grafted product may be conveniently prepared by melt blending the ungrafted polymeric composition, in the substantial absence of a solvent, with a free radical generating catalyst, such as a peroxide catalyst, in the presence of the grafting monomer in a shear-imparting reactor, such as an extruder reactor. Single screw but preferably twin screw extruder reactors such as co-rotating intermeshing extruder or counter-rotating non-intermeshing extruders but also co-kneaders such as those sold by Buss are especially preferred.

The preferred sequence of processes used for the grafting reaction includes melting the polymeric composition, adding and dispersing the grafting monomer, introducing the peroxide and venting the unreacted monomer and by-products resulting from the peroxide decomposition. Other sequences may include feeding the monomers and the peroxide pre-dissolved in a solvent. The monomer is typically introduced to the reactor at a rate of about 0.01 to about 10 wt % of the total of the polymeric composition and monomer, such as at about 1 to about 5 wt % based on the total reaction mixture weight.

The grafting reaction is carried at a temperature selected to minimize or avoid rapid vaporization and consequent losses of the catalyst and monomer and to have residence times about 6 to 7 times the half life time of the peroxide. A temperature profile where the temperature of the polymer melt increases gradually through the length of the reactor up to a maximum in the grafting reaction zone of the reactor, and then decreases toward the reactor output is preferred. Temperature attenuation in the last sections of the extruder is desirable for product pelletizing purposes.

In order to provide consistency of feeding, the peroxide is usually dissolved at an approximate 10% concentration in a mineral oil whereas the polymer and the grafting monomer are fed neat. Specific examples of useful catalysts include: Diacyl peroxides such as benzoyl peroxide; Peroxyesters such as tert-Butyl peroxy benzoate, tert-Butylperoxy acetate, OO-tert-Butyl-O-(2-ethylhexyl)monoperoxy carbonate; Peroxyketals such as n-Butyl 4,4-di-(tert-Butyl peroxy) valerate; and Dialkyl peroxides such as 1,1-bis(tert-butylperoxy)cyclohexane, 1,1-bis(tert-butylperoxy)-3,3,5-trimethylcyclohexane, 2,2-bis(tert-butylperoxy)butane, dicumylperoxide, tert-butylcumylperoxide, a,a'-bis(tert-butylperoxy-isopropyl)benzene, di-tert-butylperoxide (DTBP), 2,5-dimethyl-2,5-di(tert-butylperoxy)-hexane, 2,5-dimethyl-2,5-di(tert-butylperoxy)-hexane; and the like.

Polar Polymers

Compositions of the present disclosure may include one or more polar polymers. The term "polar polymer," as used herein, refers to a polymer formed from at least one monomer that comprises at least one heteroatom. Some examples of heteroatoms include 0, N, P and S.

A polar polymer can include an ethylene-acrylic-acid-copolymer, polymethacrylate, or a polyvinyl acetate.

In at least one embodiment, an ethylene-acrylic-acid-copolymer (EAA), ethylene acrylate copolymer (such as ethylene methyl acrylate (EMA)), a polyvinyl acetate (such as ethylene vinyl acetate), or combination(s) thereof may be present in a composition of the present disclosure instead of a grafted polyolefin. In other words, a composition can be free of grafted polyolefin.

Ethylene-acrylic-acid-copolymers can have an acrylic acid content of from about 1 wt % to about 50 wt %, such as from about 5 wt % to about 25 wt %, such as about 15 wt %, based on the total weight of the ethylene-acrylic-acid-copolymer. An ethylene-acrylic-acid-copolymer can have a melt index of from about 20 g/10 min (190° C./2.16 kg) to about 60 g/10 min (190° C./2.16 kg), such as from about 30 g/10 min (190° C./2.16 kg) to about 40 g/10 min (190° C./2.16 kg). As an example, Escor™ 5200 is an ethylene-acrylic-acid-copolymer-resin with an acrylic acid content of about 15 wt % and melt index of typically 38 g/10 min (190° C./2.16 kg). Alternatively, an ethylene-acrylic-acid-copolymer can have a melt index of from about 1 g/10 min (190° C./2.16 kg) to about 20 g/10 min (190° C./2.16 kg), such as from about 3 g/10 min (190° C./2.16 kg) to about 15 g/10 min (190° C./2.16 kg), such as from about 7 g/10 min (190° C./2.16 kg) to about 10 g/10 min (190° C./2.16 kg). As an example, Escor™ 5100 is an ethylene-acrylic-acid-copolymer-resin with an acrylic acid content of about 11 wt % and melt index of typically 8.5 g/10 min (190° C./2.16 kg), and Escor™ 5110 is an ethylene-acrylic-acid-copolymer-resin with an acrylic acid content of about 11 wt % and melt index of typically 14 g/10 min (190° C./2.16 kg).

Polyvinyl acetates, such as ethylene vinyl acetates, can have one or more of the following properties: a vinyl acetate content from 8 wt %, or 10 wt %, or 12 wt %, or 14 wt % to 16 wt %, or 18 wt %, or 20 wt %, or 22 wt %, or 24 wt % or 26 wt %, or 28 wt %, or 30 wt %; a density from 0.930 g/cm$^3$, or 0.940 g/cm$^3$, or 0.950 g/cm$^3$ to 0.960 g/cm$^3$, or 0.965 g/cm$^3$; and/or a melt index (MI) from 0.1 g/10 min, or 0.2 g/10 min, or 0.3 g/10 min, or 0.4 g/10 min to 25 g/10 min, 20 g/10 min, 10 g/10 min, or 8 g/10 min, or 7 g/10 min, or 6 g/10 min, or 5 g/10 min, or 4 g/10 min. As an example, Escorene™ Ultra FL00212 is an ethylene vinyl acetate copolymer resin having a vinyl acetate content of about 12 wt % and a melt index of typically 2.5 g/10 min (190° C./2.16 kg), and Escorene™ Ultra FL02020 is an ethylene vinyl acetate copolymer resin having a vinyl acetate content of about 20 wt % and a melt index of typically 20 g/10 min (190° C./2.16 kg).

An ethylene acrylate copolymer can have can have one or more of the following properties: from 6 wt % to 32 wt % methyl-acrylate ester (MA) content; a methyl-acrylate content from 10 wt %, or 12 wt %, or 14 wt %, or 15 wt % to 16 wt %, or 18 wt %, or 20 wt %, or 22 wt %, or 24 wt % or 26 wt %, or 29 wt %; a density from 0.920 g/cm$^3$, or 0.925 g/cm$^3$, or 0.930 g/cm$^3$ to 0.940 g/cm$^3$, or 0.950 g/cm$^3$, or 0.955 g/cm$^3$; and/or a melt index (MI) from 0.1 g/10 min, or 0.2 g/10 min, or 0.3 g/10 min, or 0.5 g/10 min, or 0.8 g/10 min, or 1.0 g/10 min, or 3.0 g/10 min, or 5.0 g/10 min to 7.0 g/10 min, or 9.0 g/10 min, or 10.0 g/10 min. As an example, Optema™ TC 120 is an ethylene methyl acrylate copolymer resin with a methyl acrylate content of about 21.5 wt % and melt index of typically 6 g/10 min (190° C./2.16 kg).

The polar polymers described herein can be produced using any suitable catalyst and/or process known for producing polar polymers. In certain embodiments, the polar polymers can include polymers prepared according to the procedures in U.S. Pat. Nos. 6,342,566; 6,384,142; 5,741,563; PCT publications WO 03/040201; and WO 97/19991.

Vinyl Alcohol Polymers and Polyamides

Compositions of the present disclosure include one or more vinyl alcohol polymers and/or one or more polyamides (PAs).

In at least one embodiment, a vinyl alcohol polymer is selected from a poly(vinyl alcohol) copolymer (PVOH), an ethylene vinyl alcohol copolymers (EVOH), or blends thereof.

A polyamide may be a crystalline or amorphous polyamide of aliphatic or aromatic nature like polyamide-6 (PA-6), polyamide-6-6 (PA-66), polyamide-12 (PA-12), poly-m-xylylene adipamide (nylon MXD6) or poly-m-xylylene pimelamide (nylon MXD7). For example, a polyamide may be poly-m-xylylene adipamide (MXD-6; commercially available from Mitsubishi Petrochemical, Japan).

In at least one embodiment, an ethylene vinyl alcohol copolymer includes 32 wt % ethylene (EVAL F101A, commercially available from EVAL Europe, Belgium).

In various embodiments, the vinyl alcohol polymer or polyamide has a melt index (I2) (2.16 kg, 190° C.) from 0.1 to 40 g/10 min, further from 0.2 to 20 g/10 min, and further from 0.5 to 10 g/10 min. In various embodiments, the vinyl alcohol polymer or polyamide has a density from 1.00 to 1.30 g/cm$^3$, further from 1.10 to 1.20 g/cm$^3$.

In various embodiments, the vinyl alcohol polymer or polyamide is selected from an ethylene vinyl alcohol polymer (EVOH) (such as EVAL H171B sold by Kuraray) or polyamide (PA) (such as Nylon 6, Nylon 66, and Nylon 6/66 sold by DuPont) and combinations thereof.

In various embodiments, the vinyl alcohol polymer or polyamide comprises at least one of the above-mentioned nylon compounds and at least one of EVOH.

Polyethylenes

Compositions of the present disclosure contain one or more polyethylenes. Polyethylenes include polyethylene homopolymers and ethylene-alpha-olefin copolymers. The ethylene-alpha-olefin copolymers have an alpha-olefin comonomer(s) content greater than 5 wt %, such as greater than 10 wt %, based on the total weight of polymerizable monomers. The amount of comonomer(s) incorporation can be greater than 15 wt %, such as greater than 20 wt %, such as greater than 25 wt %, such as greater than 30 wt %, such as greater than 35 wt %, such as greater than 40 wt %, such as greater than 45 wt %, based on the total weight of polymerizable monomers.

Comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In at least one embodiment, a comonomer is selected from propylene, butene, pentene, hexene, heptene, octene, nonene, decene, undecene, dodecene and isomers thereof. In at least one embodiment, a comonomer includes one or more $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_3$ to $C_{40}$ olefin comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

Exemplary comonomers include, but are not limited to, propylene, isobutylene, 1-butene, 1-pentene, 1-hexene, 3-methyl-1-pentene, 4-methyl-1-pentene, and 1-octene, non-conjugated dienes, polyenes, butadienes, isoprenes, pentadienes, hexadienes (for example, 1,4-hexadiene), octadienes, styrene, halo-substituted styrene, alkyl-substituted styrene, tetrafluoroethylenes, vinylbenzocyclobutene, naphthenics, cycloalkenes (for example, cyclopentene, cyclohexene, cyclooctene), and mixtures thereof. Typically, the ethylene is copolymerized with one $C_3$-$C_{20}$ alpha-olefin.

In at least one embodiment, a polyethylene is a copolymer selected from ethylene/propylene (EP) copolymer, ethylene/butene (EB) copolymer, ethylene/hexene (EH) copolymer, ethylene/octene (EO) copolymer, ethylene/alpha-olefin/diene (EAODM) terpolymer, such as ethylene/propylene/octene terpolymer.

In another embodiment, a polyethylene includes one or more diene or triene comonomers. Diene or triene comonomers can include 7-methyl-1,6-octadiene; 3,7-dimethyl-1,6-octadiene; 5,7-dimethyl-1,6-octadiene; 3,7,11-trimethyl-1,6,10-octatriene; 6-methyl-1,5heptadiene; 1,3-butadiene; 1,3-pentadiene, norbornadiene, 1,6-heptadiene; 1,7-octadiene; 1,8-nonadiene; 1,9-decadiene; 1,10-undecadiene; norbornene; tetracyclododecene; or mixtures thereof; and such as butadiene; hexadienes; and octadienes; and most such as 1,4-hexadiene; 1,9-decadiene; 4-methyl-1,4-hexadiene; 5-methyl-1,4-hexadiene; dicyclopentadiene; and 5-ethylidene-2-norbornene (ENB), 1,3-butadiene, 1,3-pentadiene, norbornadiene, and dicyclopentadiene; $C_8$-$C_{40}$ vinyl aromatic compounds including sytrene, o-, m-, and p-methylstyrene, divinylbenzene, vinylbiphenyl, vinylnapthalene; and halogen-substituted $C_8$-$C_{40}$ vinyl aromatic compounds such as chlorostyrene and fluorostyrene.

Low density polyethylene is generally prepared at high pressure using free radical initiators or in gas phase processes using Ziegler-Natta or vanadium catalysts. Low density polyethylene typically has a density in the range of 0.916 g/cm$^3$ to 0.950 g/cm$^3$. Typical low density polyethylene produced using free radical initiators is known in the industry as "LDPE". LDPE is also known as "branched" or "heterogeneously branched" polyethylene because of the relatively large number of long chain branches extending from the main polymer backbone. Polyethylene in the same density range, e.g., 0.916 g/cm$^3$ to 0.950 g/cm$^3$, which is linear and does not contain long chain branching, is known as "linear low density polyethylene" ("LLDPE") and is typically produced by conventional Ziegler-Natta catalysts or with metallocene catalysts. "Linear" means that the polyethylene has few, if any, long chain branches, typically referred to as a $g'_{vis}$ value of 0.97 or above, such as 0.98 or above. Polyethylenes having still greater density are the high density polyethylenes ("HDPEs"), e.g., polyethylenes having densities greater than 0.950 g/g/cm$^3$, and are generally prepared with Ziegler-Natta catalysts or chrome catalysts. Very low density polyethylenes ("VLDPEs") (also known as ultra-low density polyethylene ("ULDPEs")) can be produced by a number of different processes yielding polyethylenes having a density less than 0.916 g/cm$^3$, typically 0.890 g/cm$^3$ to 0.915 g/cm$^3$ or 0.900 g/cm$^3$ to 0.915 g/cm$^3$.

In at least one embodiment, a polyethylene is one or more of a ULDPE, metallocene-based very low-density polyethylene (mVLDPE), low density polyethylene (LDPE), linear low density polyethylene (LLDPE), medium density polyethylene (MDPE), cross-linked polyethylene (PEX or XLPE), high density polyethylene (HDPE), high melt strength high density polyethylene (HMS-HDPE), ultra-high density polyethylene (UHDPE), ultra-high-molecular-weight polyethylene (UHMWPE) and combinations thereof. Exemplary polyethylenes are discussed in Publication Nos. U.S. Pat. No. 7,022,770 B2, WO 2012/096698, and WO 2013/043796, which are incorporated by reference herein.

Exemplary ULDPEs are available from Exxonmobil Chemical Company under the name EXCEED™ 1012 mVLDPE (a resin developed to provide better properties than currently available with conventional VLDPE and ULDPE resins), as well as EXCEED™ 1015HA mVLDPE and EXCEED™ 3812 mVLDPE. Exemplary ULDPEs are also available from The Dow Chemical Company under the tradename ATTANE™, such as ATTANE™ 4201 G, ATTANE™ 4203, and ATTANE™ 4404 G. The ULDPEs may have a melt mass flow rate from 0.5 g/10 min to 10.0 g/10 min. The ULDPEs may have a melt index of 0.5 g/10 min to 3 g/10 min, such as 0.5 g/10 min to 2 g/10 min, such as 0.5 g/10 min to 1.5 g/10 min, of example of 1.0 g/10 min.

Exemplary LDPEs are available from ExxonMobil Chemical Company under the tradename ENABLE™ 2005 HH, ESCORENE™ Ultra FL 00328, ESCOR™ 6000, EXCEED™ 2018 MB, and EXXONMOBIL™ LDPE LD 312 Series. Exemplary LDPEs are also available from The Dow Chemical Company under the tradename DOW™ Low Density Polyethylene (LDPE), such as DOW™ LDPE 1321, DOW™ LDPE 50041, and DOW™ LDPE PG 7004. The LDPE may have a melt mass flow rate from 0.2 to 100 g/10 min.

Exemplary LLDPEs are available from ExxonMobil Chemical Company under the tradename EXXONMOBIL™ LLDPE LL 6202.19, EXXONMOBIL™ LLDPE LL 1001AV, and EXXONMOBIL™ LLDPE LL 8460 Series. Exemplary LLDPEs are also available from The Dow Chemical Company under the tradename DOW™ Linear Low Density Polyethylene (LLDPE), such as DOW™ LLDPE DFDA-7047 NT7. The LLDPE may have a melt mass flow rate from 0.2 g/10 min to 50.0 g/10 min.

Suitable MDPEs are available from ExxonMobil Chemical Company under the tradename EXXONMOBIL™ ESCORENE™ LD-117 MDPE, and EXXONMOBIL™ ESCORENE™ LD-129 MDPE. MDPEs are also available from The Dow Chemical Company under the tradename DOW™ Medium Density Polyethylene (MDPE), such as DOW™ MDPE 8818, DOW™ DMDA-8962 NT 7, and DOWLEX™ 2432 E. MDPE resins may be characterized as having a density from 0.926 g/cm$^3$ to 0.940 g/cm$^3$.

Suitable HDPEs are available from ExxonMobil Chemical Company under the tradename PAXON™ AL55-003, PAXON™ HYA021L, and EXXONMOBIL™ HDPE HD 7800P. HDPEs are also available from The Dow Chemical Company under the tradename DOW™ HDPE 25055E, DOW™ HDPE KT 10000 UE, and UNIVAL™ DMDA-6200 NT 7.

The polyethylene homopolymers and copolymers described herein can be produced using any suitable catalyst and/or process known for producing polyethylene homopolymers and copolymers. In certain embodiments, the polyethylene homopolymers can include polymers prepared according to the procedures in U.S. Pat. Nos. 6,342,566; 6,384,142; 5,741,563; PCT publications WO 03/040201; and WO 97/19991.

Polypropylene

Compositions of the present disclosure may optionally include one or more propylene polymers. A "propylene polymer", otherwise known as "polypropylene" or "propylene copolymer", is a polymer or copolymer comprising at least 50 mol % propylene derived units; and so on. The term "polypropylene" is meant to encompass isotactic polypropylene (iPP), defined as having at least 10% or more isotactic pentads, highly isotactic polypropylene, defined as having 50% or more isotactic pentads, syndiotactic polypropylene (sPP), defined as having at 10% or more syndiotactic pentads, homopolymer polypropylene (hPP, also called propylene homopolymer or homopolypropylene), and so-called random copolymer polypropylene (RCP, also called propylene random copolymer). Herein, an RCP can include a copolymer of propylene and 1 to 10 wt % of an olefin chosen from ethylene and $C_4$ to $C_8$ 1-olefins. For example, an isotactic polymer (iPP) can have at least 20% (such as at least 30%, such as at least 40%) isotactic pentads. A polyolefin is "atactic", also referred to as "amorphous", if it has less than 10% isotactic pentads and syndiotactic pentads.

A polypropylene of the present disclosure may be in the form of a copolymer or a homopolymer. For example, the polypropylene is selected from random copolymer polypropylene (rcPP), impact copolymer polypropylene (homopolymer propylene modified with at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof. Exemplary embodiments include a polypropylene homopolymer, e.g., the polypropylene component of the composition may consist essentially of the polypropylene homopolymer.

Suitable propylene-based polymers include propylene homopolymers and propylene copolymers. The propylene copolymer can be a random or block copolymer, propylene-based terpolymer, or a branched polypropylene.

In at least one embodiment, the propylene is copolymerized with ethylene or one $C_4$-$C_{20}$ alpha-olefin. Suitable comonomers include for copolymerizing with propylene include ethylene, 1-butene, 1-pentene, 1-hexene, 1-heptene, 1-octene, 1-nonene, 1-decene, 1-undecene, 1-dodecene, as well as 4-methyl-1-pentene, 4-methyl-1-hexene, 5-methyl-1-hexene, vinylcyclohexene, and styrene.

Exemplary propylene copolymers include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene.

In at least one embodiment, the polypropylene polymer is a propylene-alpha-olefin copolymer. The "propylene-alpha-olefin copolymers" described herein are copolymers of propylene derived units and one or more units derived from ethylene or a $C_4$-$C_{20}$ alpha-olefin and optionally one or more diene-derived units, and are relatively elastic and/or form nonwoven fibers and fabrics that are elastic (Ultimate Elongation from greater than 500%). The overall comonomer content of the copolymer is within the range from 5 wt % to 35 wt % in one embodiment.

In at least one embodiment, where more than one comonomer is present, the amount of a particular comonomer may be less than 5 wt %, but the combined comonomer content is greater than 5 wt %. The propylene-alpha-olefin copolymers may be described by any number of different parameters, and those parameters may comprise a numerical range made up of any desirable upper limit with any desirable lower limit as described herein for the propylene-alpha-olefin copolymers.

The propylene-alpha-olefin copolymer may be either a random copolymer (the comonomer-derived units are randomly distributed along the polymer backbone) or a block copolymer (the comonomer-derived units occur along long sequences), or any variation thereof (having some properties of each). The presence of randomness or blocks in a copolymer can be determined by C-NMR as is known in the art.

In at least one embodiment, the propylene-alpha-olefin copolymer comprises ethylene or $C_4$-$C_{20}$ alpha-olefin-derived units (or "comonomer-derived units") within the range of from 5 wt % to 50 wt %, such as 6 wt % to 40 wt %, such as 7 wt % to 35 wt %, such as 8 wt % to 20 wt %, such as 10 wt % to 15 wt % by weight of the copolymer. The propylene-alpha-olefin copolymer may also comprise two different comonomer-derived units. Further, these copolymers and terpolymers may comprise diene-derived units as described below.

In at least one embodiment, the propylene-alpha-olefin copolymer comprises propylene-derived units and comonomer units selected from ethylene, 1-hexene and 1-octene. And in a more particular embodiment, the comonomer is ethylene, and thus the propylene-alpha-olefin copolymer is a propylene-ethylene copolymer.

The polypropylene homopolymers or propylene-alpha-olefin copolymers of the present disclosure can have a melt flow rate ("MFR") of 100 or less g/10 min, such as 50 or less g/10 min, such as 30 or less g/10 min, as measured in accordance with ASTM D 1238 at 230° C./2.16 kg.

In at least one embodiment, the propylene-alpha-olefin copolymer is a terpolymer having 10 wt % or less of diene derived units (or "diene"), such as 8 wt % or less, such as 5 wt % or less, such as 3 wt % or less, based on the total weight of the terpolymer, and within the range of from 0.1 wt % to 10 wt %, such as 0.5 wt % to 8 wt %, such as 1 wt % to 5 wt %.

Suitable dienes include, for example: 1,4-hexadiene, 1,6-octadiene, 5-methyl-1,4-hexadiene, 3,7-dimethyl-1,6-octadiene, dicyclopentadiene (DCPD), ethylidene norbornene (ENB), norbornadiene, 5-vinyl-2-norbornene (VNB), or combinations thereof.

In at least one embodiment, the propylene-based polymers comprise units derived from propylene in an amount of at least 60 wt %, such as at least 80 wt %, such as at least 85 wt % of the polymer (based on the total weight of polymerizable monomers). The amount of units derived from ethylene in propylene/ethylene copolymers can be at least about 0.1 wt %, such as at least about 1 wt %, such as at least about 5 wt %, and the amount of units derived from ethylene present in these copolymers typically is not in excess of about 35 wt %, such as not in excess of about 30 wt %, such as not in excess of about 20 wt % of the copolymer (based on the total weight of the polymer). The amount of units derived from an additional unsaturated comonomer(s), if present, is typically at least about 0.01, such as at least about 1 wt %, such as at least about 5 wt %, and the amount of units derived from the unsaturated comonomer(s) typically does not exceed about 35 wt %, such as it does not exceed about 30 wt %, such as it does not exceed about 20 wt % of the copolymer (based on the total weight of the polymer).

The propylene-based polymer used in the present disclosure may be of any molecular weight distribution (MWD). In at least one embodiment, the propylene-based polymer is a propylene-alpha-olefin copolymer, which has a MWD of 5 or less, such as 4 or less, such as 3 or less. The propylene-alpha-olefin copolymer can have an MWD from 1 to 5, such as from 1.5 to 4.5, such as from 2 to 4. In another embodiment, the MWD is 3.5 or less, such as 3 or less, such as 2.8 or less, such as 2.5 or less, such as 2.3 or less. All individual values and subranges from about 1 to 5 are included herein and disclosed herein.

In at least one embodiment, a propylene-based polymer has a percent crystallinity within the range from 0.5% to 40%, such as from 1% to 30%, such as from 5% to 25%, wherein "percent crystallinity" is determined according to the DSC procedure described herein.

In at least one embodiment, a propylene-based polymer has a percent crystallinity from less than 40%, less than 35%, less than 30%, less than 25%, less than 20%, or less than 15%.

The propylene polymer can have melt flow rate ("MFR"), as measured per ASTM D-1238, 2.16 kg at 230° C., of about 500 or less g/10 min, such as 200 or less g/10 min, such as 100 or less g/10 min, such as 75 or less g/10 min, such as 50 or less g/10 min A propylene polymer can have an MFR of from about 1 to about 25, such as about 1 to about 20. The crystallinity of the first polymer should be derived from isotactic polypropylene sequences. The isotacticity of the propylene polymer can be illustrated by the presence of a preponderance of the propylene residues in the polymer in mm triads. As noted elsewhere herein, the tacticity of the propylene polymer can be greater than the tacticity of either the blend or the ethylene polymer, e.g., where the propylene polymer is isotactic and the ethylene polymer is atactic.

The crystallinity of the propylene polymer can be expressed in terms of heat of fusion. The propylene polymer of the present disclosure can have a heat of fusion, as determined by DSC, ranging from 1 J/g, or 1.5 J/g, or 3 J/g, or 4 J/g, or 6 J/g, or 7 J/g or 10, to 20 or 30 J/g, or 40 J/g, or 50 J/g, or 60 J/g, or 106 J/g. In one embodiment, the heat of fusion of the propylene polymer is less than 65 J/g. Without wishing to be bound by theory, it is believed that the propylene polymer has generally isotactic crystallizable propylene sequences, and the above heats of fusion are believed to be due to the melting of these crystalline segments.

The level of crystallinity of the propylene polymer can also be reflected in its melting point. For example, a propylene polymer can have a single melting point. However, a sample of propylene copolymer will often show secondary melting peaks adjacent to the principal peak. The highest peak is considered the melting point. The propylene polymer described herein can have a melting point as measured by DSC within the range having an upper limit of 165° C., or 150° C., or 105° C., or 90° C., or 80° C., or 70° C., and a lower limit of 0° C., or 20° C., or 25° C., or 30° C., or 35° C., or 40° C., or 45° C. For example, the propylene polymer can have a melting point of 105° C. or less, such as 100° C. or less, such as 90° C. or less. In at least one embodiment, the propylene polymer has a melting point of 25° C. or greater, or 40° C. or greater.

The propylene homopolymers and copolymers described herein can be produced using any suitable catalyst and/or process known for producing polypropylene homopolymers and copolymers. In certain embodiments, the polypropylene homopolymers can include polymers prepared according to the procedures in WO 02/36651, U.S. Pat. No. 6,992,158, and/or WO 00/01745. Methods for producing the propylene-based polymers may be found in U.S. Pat. Nos. 7,232,871 and 6,881,800.

Additional (or Alternative) Additives

Additionally, further additional additives may be included in the composition, in one or more components of the composition, and/or in a product formed from the composition, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

In at least one embodiment, the amount of additive in a composition is less than 10 wt %, such as less than 5 wt %, such as less than 1 wt %, such as about 0 wt %.

For compositions of the present disclosure that are formed from recycled barrier material, the compositions may further include conventional tie layer materials, such as Bynel.

Compositions

Compositions of the present disclosure are compositions including a first polymer (polyethylene), optionally a second polymer (polypropylene), a polar polymer and/or a grafted polyolefin, a vinyl alcohol polymer and/or a polyamide, and optionally additional additives such as a propylene-based elastomer. As used herein, a "composition" can include individual components of the composition (e.g., grafted polyolefin, polar polymer(s)) and/or reaction product(s) of two more components of the composition. Compositions of the present disclosure can be present in any suitable form, such as an article, such as a film, etc. (as described in more detail below).

In at least one embodiment, the amount of first polymer (polyethylene)+optional second polymer (polypropylene) in a composition is from about 10 wt % to about 99 wt %, based on the total weight of the composition, such as about 20 wt % to about 95 wt %, such as about 30 wt % to about 90 wt %, such as about 40 wt % to about 90 wt %, such as about 50 wt % to about 90 wt %, such as about 60 wt % to about 90 wt %, such as about 70 wt % to about 90 wt %.

In at least one embodiment, the amount of polar polymer and/or grafted polyolefin in a composition is from about 0.1 wt % to about 50 wt %, based on the total weight of the composition, such as about 0.2 wt % to about 20 wt %, such as about 0.3 wt % to about 10 wt %, such as about 0.4 wt % to about 9 wt %, such as about 0.5 wt % to about 8 wt %, such as about 1 wt % to about 7 wt %, such as about 2 wt % to about 5 wt %.

In at least one embodiment, the amount of vinyl alcohol polymer and/or polyamide in a composition is from 0.1 wt % to 50 wt %, based on the total weight of the composition, such as about 0.2 wt % to about 20 wt %, such as about 0.3 wt % to about 10 wt %, such as about 0.4 wt % to about 9 wt %, such as about 0.5 wt % to about 8 wt %, such as about 1 wt % to about 7 wt %, such as about 2 wt % to about 5 wt %.

In at least one embodiment, the amount of additional additives or adhesives in a composition is from about 0.1 wt % to about 50 wt %, based on the total weight of the composition, such as about 0.2 wt % to about 20 wt %, such as about 0.3 wt % to about 10 wt %, such as about 0.4 wt % to about 9 wt %, such as about 0.5 wt % to about 8 wt %, such as about 1 wt % to about 7 wt %, such as about 2 wt % to about 5 wt %.

In at least one embodiment, a ratio (by weight) of (first polymer+second polymer) to (polar polymer and/or grafted polyolefin) in a composition is about 90:10, or from about 99:1 to 1:99, or 95:5 to 50:50, or 95:5 to 75:25 or 95:5 to 90:10, such as about 92:8.

In at least one embodiment, a ratio (by weight) of (vinyl alcohol polymer and/or polyamide) to (polar polymer and/or grafted polyolefin) in a composition is about 50:50, or from about 90:10 to 10:90, or 80:20 to 20:80, or 80:20 to 50:50 or 75:25 to 60:40, such as about 66:34, alternatively about 85:15.

In at least one embodiment, a ratio (by weight) of (first polymer+second polymer) to (vinyl alcohol polymer and/or polyamide) in a composition is about 90:10, or from about 99:1 to 1:99, or 95:5 to 30:70, or 90:10 to 40:60 or 75:25 to 50:50, such as about 60:40.

In at least one embodiment, polyamide includes a polyamide and vinyl alcohol polymer includes an EVOH, where the ratio (by weight) of polyamide to EVOH is from about 99:1 to 1:99, or 95:5 to 30:70, or 90:10 to 40:60 or 85:15 to 60:40, such as about 75:25.

Compositions (also referred to as "blends") of the present disclosure may be produced by mixing the first polymer (polyethylene), the optional second polymer (polypropylene), the polar polymer and/or the grafted polyolefin, the vinyl alcohol polymer and/or polyamide, and the optional additional additive(s) together, by connecting reactors together in series to make reactor blends or by using more than one catalyst, for example, a dual metallocene catalyst, in the same reactor to produce multiple species of polymer. Additionally or alternatively, the polymers can be mixed together prior to being put into an extruder or may be mixed in an extruder.

The compositions may be formed by dry blending the individual components and subsequently melt mixing in a mixer, or by mixing the polymers together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

The polymers and components of the present disclosure can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of the components of the composition.

Mixing may involve first dry blending using, for example, a tumble blender, where the polymers (and optional additive) are brought into contact first, without intimate mixing, which may then be followed by melt blending in an extruder. Another method of blending the components is to melt blend the first polymer as a pellet and the second polymer as a pellet directly in an extruder or batch mixer. It can also involve a "master batch" approach, where the final modifier concentration is achieved by combining a neat polymer with an appropriate amount of modified polymer that had been previously prepared at a higher additive concentration. The mixing may take place as part of a processing method used to fabricate articles, such as in the extruder on an injection molding machine or blown-film line or fiber line.

In at least one embodiment of the present disclosure, the first polymer (polyethylene), the optional second polymer (polypropylene), the polar polymer and/or the grafted polyolefin, the vinyl alcohol polymer and/or polyamide, and the optional additional additive(s) can be "melt blended" in an apparatus such as an extruder (single or twin screw) or batch mixer. The first polymer (polyethylene), the optional second polymer (polypropylene), the polar polymer and/or the grafted polyolefin, the vinyl alcohol polymer and/or polyamide, and the optional additional additive(s) may also be "dry blended" with one another using a tumbler, double-cone blender, ribbon blender, or other suitable blender. In yet another embodiment, the first polymer (polyethylene), the optional second polymer (polypropylene), the polar polymer and/or the grafted polyolefin, the vinyl alcohol polymer and/or polyamide, and the optional additional additive(s) are blended by a combination of approaches, for example a tumbler followed by an extruder. A suitable method of blending is to include the final stage of blending as part of an article fabrication step, such as in the extruder used to melt and convey the composition for a molding step like injection molding or blow molding. This can include direct injection of one or more polymer and/or elastomer into the extruder, either before or after a different one or more polymer and/or elastomer is fully melted. Extrusion technology for polymers is described in more detail in, for example, PLASTICS EXTRUSION TECHNOLOGY p. 26-37 (Friedhelm Hensen, ed. Hanser Publishers 1988).

In another aspect of the present disclosure, the first polymer (polyethylene), the optional second polymer (polypropylene), the polar polymer and/or the grafted polyolefin, the vinyl alcohol polymer and/or polyamide, and the optional additional additive(s) may be blended in solution by any suitable means by using a solvent that dissolves the components of the composition to a suitable extent. The blending may occur at any temperature or pressure where the components remain in solution. Suitable conditions include blending at high temperatures, such as 10° C. or more, such as 20° C. or more over the melting point of one or more polymer and/or elastomer. Such solution blending would be particularly useful in processes where one or more polymer and/or elastomer is made by solution process and a modifier is added directly to the finishing train, rather than added to the dry polymer, polymer and/or elastomer in another blending step altogether. Such solution blending would also be particularly useful in processes where one or more polymer and/or elastomer is made in a bulk or high pressure process where one or more polymer and/or elastomer and the modifier are in soluble in the monomer (as solvent). As with the solution process, one or more polymer and/or elastomer can be added directly to the finishing train rather than added to the dry one or more polymer and/or elastomer in another blending step altogether.

Accordingly, in the cases of fabrication of products using methods that involve an extruder, such as injection molding, blow molding, blown film, cast, coating, and compounding, any suitable means of combining the one or more components of the composition to achieve the desired composition serve equally well as fully formulated pre-blended pellets, since the forming process can include a re-melting and mixing of the raw material; example combinations include simple blends of neat polymer and/or elastomer pellets (and optional additive(s)), neat polymer and/or elastomer granules, and neat polymer and/or elastomer pellets and pre-blended pellets. However, little mixing of the melt components occurs in the process of compression molding, and pre-blended pellets would be preferred over simple blends of the constituent pellets.

In another embodiment, a composition of the present disclosure is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends described above may be produced by mixing the polymers and/or elastomers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The heterogeneous polymer/elastomer blends described herein may be formed into desirable end use products by any suitable means. They are particularly useful for making articles by blow molding, extrusion, injection molding, thermoforming, gas foaming, elasto-welding and compression molding techniques.

Blow molding forming, for example, includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In at least one embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C., such as between 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending in part on the thickness. Finally, the mold is opened and the shaped composite article ejected. Likewise, molded articles may be fabricated by injecting molten polymer into a mold that shapes and solidifies the molten polymer into a desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker.

Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded article. Sheet made from a composition of the present disclosure may be used to form a container. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C.

In an embodiment of the injection molding process, where a substrate material is injection molded into a tool including the shaped laminate, the melt temperature of the substrate material is between 225° C. and 255° C. in one embodiment, and between 230° C. and 250° C. in another embodiment, the fill time is from 2 to 10 seconds in one embodiment, from 2 to 8 seconds in another embodiment, and a tool temperature of from 25° C. to 65° C. in one embodiment, and from 27° C. and 60° C. in another embodiment. In at least one embodiment, the substrate material is at a temperature that is hot enough to melt any tie-layer material or backing layer to achieve adhesion between the layers.

In yet another embodiment of the present disclosure, the compositions are secured to a substrate material using a blow molding operation. Blow molding is particularly useful in such applications as for making closed articles such as fuel tanks and other fluid containers, playground equipment, outdoor furniture and small enclosed structures. In one embodiment of this process, a composition of the present disclosure is extruded through a multi-layer head, followed by placement of the uncooled laminate into a parison in the mold. The mold, with either male or female patterns inside, is then closed and air is blown into the mold to form the part. It will be understood by those skilled in the art that the steps outlined above may be varied, depending upon the desired result. For example, an extruded sheet formed from a composition of the present disclosure may be directly thermoformed or blow molded without cooling, thus skipping a cooling step. Other parameters may be varied as well in order to achieve a finished composite article having desirable features.

In at least one embodiment, a composition of the present disclosure is formed into an article such as a weather seal, a hose, a belt, a gasket, a molding, boots, an elastic fiber and like articles. Foamed end-use articles are also envisioned. More specifically, the blends of the present disclosure can be formed as part of a vehicle part, such as a weather seal, a brake part including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

Notched Charpy Impact Strength:

Charpy impact test, also known as the Charpy V-notch test, is a standardized high strain-rate test which determines the amount of energy absorbed by a material during fracture. The quantitative result of the impact tests the energy needed to fracture a material and can be used to measure the toughness of the material. The Notched Charpy impact strength is measured as per ISO 179-1/1eA, using equipment made by Empire Technologies Inc. In at least one embodiment, a composition of the present disclosure has a Notched Charpy impact strength at 23° C. of 8 $kJ/m^2$ or greater, such as 10 $kJ/m^2$ or greater, such as 12 $kJ/m^2$ or greater, such as 14 $kJ/m^2$ or greater, such as 20 $kJ/m^2$ or greater, such as 30 $kJ/m^2$ or greater, such as 40 $kJ/m^2$ or greater (or from 8 $kJ/m^2$ or 25 $kJ/m^2$ or 30 $kJ/m^2$ to 16 $kJ/m^2$ or 20 $kJ/m^2$ or 30 $kJ/m^2$ or 40 $kJ/m^2$ or 50 $kJ/m^2$ or 60 $kJ/m^2$ or 70 $kJ/m^2$ or 80 $kJ/m^2$ or 100 $kJ/m^2$).

Sub-Micron Domains:

The size and concentration of microdomains of vinyl alcohol polymer or polyamide (e.g., PA or EVOH) formed in the bulk domain (first polymer (polyethylene)) can be determined using Scanning Electron Microscopy.

For Scanning Electron Microscopy, a sample can be prepared using any suitable coater, such as Cressington208HR Sputter Coater and Specimen Preparation for SEM. A Focused Ion Beam-Scanning Electron Microscope ("FIB-SEM") FEI Helios NanoLabG3 UC, manufactured by FEI™ can be used to prepare in situ cross sections of the samples by etching material away with a focused gallium beam (FIB) and recording the micrographs with the electron beam (SEM). The imaging parameters can be: 2 keV and 0.4 nA at a working distance of 4 mm.

The film samples were stained with $RuO_4$ (ruthenium tetroxide) vapor following the method developed by Brown and Butler (Polymer Vol. 38 No. 15, pp. 3937-3945, 1997) to enhance the contrast of polymers, based on their crystallinity. Low-crystallinity materials take up more stain than high-crystallinity materials; higher concentrations of stain appear brighter when imaged using back-scattered electrons.

A composition of the present disclosure has a submicron domain content, defined as the percentage of domains having a diameter of 1 micron or less, based on the amount of total microdomains of vinyl alcohol polymer and/or polyamide of a given area of the composition sample, as determined by Scanning Electron Microscopy. In at least one embodiment, at least a portion (e.g. a 1 mm$^2$ area) of a composition of the present disclosure has a submicron domain content of 50% or greater per mm$^2$, such as 60% or greater, such as 70% or greater, such as 80% or greater, such as 90% or greater, based on the total number of microdomains of the portion. Without being bound by theory, it is believed that the improved microdomain uniformity and small microdomains provide improved mechanical and/or optical properties of compositions of the present disclosure.

Films

Compositions of the present disclosure can be used in monolayer films or multilayer films. These films may be formed by any suitable extrusion or coextrusion technique. Films may be unoriented, uniaxially oriented, or biaxially oriented. Physical properties of the film may vary depending on the film forming techniques used.

One or more of the foregoing polymers, such as the foregoing blends thereof, may be used in a variety of end-use applications, such as mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a composition layer can be extrusion coated or laminated onto an oriented composition layer or both composition layers can be coextruded together into a film and then oriented. Likewise, oriented composition could be laminated to oriented composition or oriented composition could be coated onto polypropylene or polyethylene (or vice versa) then optionally the combination could be oriented even further. Typically the films are oriented in the Machine Direction (MD) at a ratio of up to 15, such as from 3 to 15, alternatively from 1 to 3, such as from 5 to 7, and in the Transverse Direction (TD) at a ratio of up to 15, such as from 3 to 15, alternatively from 1 to 3, such as 7 to 9. However, in at least one embodiment the film is oriented to the same extent in both the MD and TD directions.

The films may vary in thickness depending on the intended application; however, films of a thickness from 1 μm to 150 μm are usually suitable, such as from 10 μm to 150 μm. Films intended for packaging are usually from 10 μm to 70 μm thick. The thickness of the sealing layer is typically 0.2 μm to 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

Films of the present disclosure include any suitable film structure and film application. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any suitable technique, such as for example, techniques utilized to prepare blown, extruded, and/or cast stretch and/or shrink films (including shrink-on-shrink applications).

In one embodiment, multilayer films (or multiple-layer films) may be formed by any suitable method. The total thickness of multilayer films may vary based upon the application desired. A total film thickness of about 5-100 μm, more typically about 10-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In one embodiment the multilayer films are composed of five to 11 layers.

To facilitate discussion of different film structures, the following notation is used herein. Each layer of a film is denoted "A" or "B". Where a film includes more than one A layer or more than one B layer, one or more prime symbols (', ", ''', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of 100 (dimensionless) indicated numerically and separated by slashes; e.g., the relative thickness of an A/B/A' film having A and A' layers of 10 μm each and a B layer of 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', AB/B'/A', B/A/A'/B', A/B/B'/B", B/A/B'/B" and B/B'/B"/B'''; (d) five-layer films, such as A/A'/A"'/A'''/B, A/A'/A"/B/A''', A/A'/B/A"/A''', A/A'/A"/B/B', A/A'/B/A"/B', A/A'/B/B'/A", A/B/A'/B'/A", A/B/A'/A"/B, A/A'/A"/B B/A/A'/B'/B", A/A'/B/B'/B", A/B/A'/B"/A', B/A/A'/B'/B", B/A/B'/A'/B", B/A/B'/B"/A', A/B/B'/B"/B''', B/A/B'/B"/B''', B/B'/A/B"/B''', and B/B'/B"/B'''/B""; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

The films can further be embossed, or produced or processed according to other known film processes. The films can be tailored to specific applications by adjusting the thickness, materials and order of the various layers, as well as the additives in or modifiers applied to each layer.

In at least one embodiment, the melt strength of a composition (e.g., of a film) may be from about 1 to about 540 cN, about 1 to about 50 cN, about 1 to about 25 cN, about 3 to about 15 cN, about 4 to about 12 cN, or about 5 to about 10 cN, or about 5 to about 15 cN, when measured at 190° C. In some embodiments, the composition has a melt strength of at least about 5 cN, at least about 10 cN, or at least about 15 cN, and 30 up to about 20 cN, when measured at 190° C. The melt strength of a composition at a particular temperature may be determined with a Gottfert Rheotens Melt Strength Apparatus. To determine the melt strength, a composition (e.g., of a film) melt strand extruded from the capillary die is gripped between two counter-rotating wheels on the apparatus. The take-up speed is increased at a constant acceleration of 12 mm/s². The maximum pulling force (in the unit of cN) achieved before the strand breaks or starts to show draw-resonance is determined as the melt strength. The temperature of the rheometer is set at 190° C. The capillary die has a length of 30 mm and a diameter of 2 mm. The film melt is extruded from the die at a speed of 10 mm/s. The distance between the die exit and the wheel contact point should be 122 mm.

In at least one embodiment, a film of the present disclosure has an averaged 1% Secant Modulus (M), at 23° C. according to a modified ASTM D882-18 (described in further detail below) of from about 100 MPa to about 520 MPa. In at least one embodiment, a film has an averaged 1% Secant Modulus (M), at 23° C. according to modified ASTM D882-18 of from about 150 MPa to about 400 MPa, such as from about 200 MPa to about 300 MPa, alternatively, from about 300 MPa to about 400 MPa, such as from about 300 MPa to about 350 MPa. In at least one embodiment, a film has a TD 1% Secant Modulus at 23° C. according to modified ASTM D882-18 of from about 150 MPa to about 520 MPa, such as from about 200 MPa to about 300 MPa, alternatively, from about 300 MPa to about 520 MPa, such as from about 300 MPa to about 350 MPa.

A film of the present disclosure can have an Elmendorf Tear value, in accordance with ASTM D-1922. In at least one embodiment, a film has an Elmendorf Tear (MD) of at least 30 g/mil, such as at least 100 g/mil, such as at least 150 g/mil, such as at least 200 g/mil, or such as at least 300 g/mil. For example, the Elmendorf Tear (MD) can be from about 100 g/mil to about 250 g/mil, from about 150 g/mil to about 500 g/mil, from about 200 g/mil to about 500 g/mil, or from about 200 to about 450 g/mil, alternatively from about 400 to about 500 g/mil.

A film of the present disclosure also has an Elmendorf Tear value, in accordance with ASTM D-1922. In at least one embodiment, a film has an Elmendorf Tear (TD) of at least 200 g/mil, such as at least 300 g/mil, such as at least 400 g/mil, or such as at least 500 g/mil. For example, the Elmendorf Tear (TD) can be from about 200 g/mil to about 800 g/mil, from about 250 g/mil to about 600 g/mil, from about 300 g/mil to about 600 g/mil, from about 400 to about 600 g/mil, or from about 450 g/mil to about 550 g/mil.

A film of the present disclosure also has a Dart Drop Impact (or Impact Failure or Dart F50 or Dart Drop Impact Strength (DIS)), reported in grams (g) or grams per mil (g/mil), in accordance with ASTM D-1709, method A. A film of the present disclosure can have a Dart Drop Impact of from about 5 g/mil to about 600 g/mil. In at least one embodiment, the film has a Dart drop of at least about 200 g/mil, such as at least about 250 g/mil, such as at least about 300 g/mil, such as at least about 350 g/mil. For example, the Dart drop can be from about 10 g/mil to about 550 g/mil, from about 10 g/mil to about 400 g/mil, from about 10 g/mil to about 200 g/mil.

Shrink of a film, reported as a percentage, can be measured by cutting circular specimens from a film using a 100 mm die. The samples can be marked in their respective directions, dusted with talc, and placed on a pre-heated, talc covered tile. The samples can then heated using a heat gun (e.g., model HG-501A) for approximately 10 to 45 seconds, or until any dimensional change ceases. Values are the average of three specimens. A negative shrinkage number indicates expansion of a dimension after heating when compared to its pre-heating dimension.

A strain hardening ratio (SHR) is used to characterize the upswing in extensional viscosity and is defined as the ratio of the maximum transient extensional viscosity over three times the value of the transient zero-shear-rate viscosity at the same strain. Strain hardening is present in the material when the ratio is greater than 1. In at least one embodiment, a film has a strain hardening ratio of from about 1 to about 8, such as from about 1 to about 5, such as from about 2 to about 5.

A film of the present disclosure may have an Elongation at Break (Machine Direction) of from about 200% to about 2000%, such as from about 300% to about 1000%, such as from about 400% to about 600%, as measured per the modified ASTM D882-18 (described below).

A film of the present disclosure may have an Elongation at Break (Transverse Direction) of from about 200% to about 2000%, such as from about 400% to about 1000%, such as from about 400% to about 800%, as measured per the modified ASTM D882-18 (described below).

In certain embodiments, the film may have a puncture energy at break energy (also known as puncture energy), in accordance with a modified BSI CEN 14477 (described in more detail below), of at least about 1 mJ, such as at least about 2 mJ, such as at least about 3 mJ. In at least one embodiment, a film has a puncture energy of from about 0.5 mJ to about 6 mJ, such as from about 1 mJ to about 3 mJ.

In certain embodiments, the film may have a force at break energy in the machine direction (MD), in accordance with the modified ASTM D882-18 (described below), of at least about 15 MPa, such as at least about 20 MPa, such as at least about 25 MPa. In at least one embodiment, a film has a force at break of from about 15 MPa to about 45 MPa, such as from about 20 MPa to about 45 MPa, such as from about 25 MPa to about 30 MPa.

In certain embodiments, the film may have a force at break energy in the transverse direction (TD), in accordance with the modified ASTM D882-18 (described below), of at least about 15 MPa, such as at least about 20 MPa, such as at least about 25 MPa. In at least one embodiment, a film has a force at break of from about 15 MPa to about 30 MPa, such as from about 20 MPa to about 30 MPa, such as from about 20 MPa to about 25 MPa.

In certain embodiments, the film may have a puncture maximum, in accordance with modified BSI CEN 14477 (described in more detail below), of at least about 1,000 mN, such as at least about 1,500 mN, such as at least about 1,750 mN. In at least one embodiment, a film has a puncture maximum of from about 1,000 mN to about 2,500 mN, such as from about 1,250 mN to about 2,000 mN, such as from about 1,600 mN to about 1,800 mN.

In certain embodiments, the film may have a puncture E break, in accordance with modified BSI CEN 14477 (described in more detail below), of at least about 2 mm, such as at least about 2.5 mm, such as at least about 3 mm. In at least one embodiment, a film has a puncture E break of from about 0.5 mm to about 3 mm, such as from about 1 mm to about 2.7 mm, such as from about 2.2 mm to about 2.7 mm.

In at least one embodiment, a film of the present disclosure has a haze value of about 45% or less, about 40% or less, about 35% or less, about 30% or less, about 25% or less, about 20% or less, about 15% or less, or about 10% or less, as determined by ASTM D-1003.

In at least one embodiment, a film of the present disclosure has a clarity (defined as regular transmitted light that is deflected less than 0.1 from the axis of incident light through the bulk of the film sample) of about 80% or greater, about 85% or greater, about 90% or greater, about 95% or greater, as determined by ASTM D1746.

In at least one embodiment, a film of the present disclosure has a gloss of about 30% or greater, about 35% or greater, about 40% or greater, about 45% or greater, about 50% or greater, about 55% or greater, about 60% or greater, as determined by ASTM D-2457, where a light source is beamed onto the plastic surface at an angle of 45° and the amount of light reflected is measured.

The performance of the polymer composition being formed into a film can be characterized as a Maximum Die Rate. The "Maximum Die Rate" is a normalized extrusion rate by die size which is commonly used in the blown film industry. The Maximum Die Rate as used herein is expressed as: Maximum Die Rate [lb/in-hr]=Extrusion Rate [lb/hr]/Die Circumference [inch]. The metric definition of the Maximum Die Rate is expressed as: Maximum Die Rate [kg/mm-hr]=Extrusion Rate [kg/hr]/Die Diameter [mm]. The Maximum Die Rate at which the film is formed can be greater than about 13 lb/in-hr (0.73 kg/mm-hr) or about 16 lb/in-hr (0.90 kg/mm-hr) or about 24 lb/in-hr (1.34 kg/mm-hr), or from about 13 lb/in-hr (0.73 kg/mm-hr), or about 16 lb/in-hr (0.90 kg/mm-hr), or about 24 lb/in-hr (1.34 kg/mm-hr) to about 30 (1.69 kg/mm-hr), or about 40 lb/in-hr (2.25 kg/mm-hr); and such as the Maximum Rate of extrusion is from about 350 lb/hr (159 kg/hr) to about 500 lb/hr (227 kg/hr). Note that for the "Maximum Die Rate" in the English unit, the die dimension is the die circumference, while in metric unit, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

Stretch Films

Compositions of the present disclosure may be utilized to prepare stretch films. Stretch films can be used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

Compositions of the present disclosure may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films can be used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40.

Retail films can be used for packaging and/or bundling articles for consumer use, such as, for example, in super-market goods. Such films are typically formed in a single bubble blown extrusion process to a thickness of about 35 μm to 80 μm, with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein have been observed to have a sharp shrinking point when subjected to heat from a heat gun at a high heat setting, which indicates that they may be especially suited for use as the inner layer in a variety of shrink-on-shrink applications.

Greenhouse Films

Compositions of the present disclosure may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Compositions of the present disclosure may be utilized to prepare bags. Bags include those bag structures and bag applications known to those skilled in the art. Exemplary bags include shipping sacks, trash bags and liners, industrial liners, produce bags, and heavy duty bags.

Packaging

Compositions of the present disclosure may be utilized to prepare packaging. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

Compositions of the present disclosure may be used in suitable blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process can be performed to provide any suitable design having a hollow shape, including bottles, tanks, toys, household goods, automobile parts, and other hollow containers and/or parts.

Blow molding processes may include extrusion and/or injection blow molding, as described above. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

Compositions of the present disclosure may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Compositions of the present disclosure may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetic attributes of the non-polymer substrate. In this process, the substrate is typically fed from a roll into a molten polymer as the polymer is extruded from a slot die, which is similar to a cast film process. The resultant structure is cooled, typically with a chill roll or rolls, and formed into finished rolls.

Extrusion coating materials can be used in, for example, food and non-food packaging, pharmaceutical packaging, and manufacturing of goods for the construction (insulation elements) and photographic industries (paper).

Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising composition(s) of the present disclosure. Such devices include, for example, electronic cables, computer and computer-related equipment, marine cables, power cables, telecommunications cables or data transmission cables, and combined power/telecommunications cables.

Electrical devices can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Rotomolded Products

Also provided are rotomolded products including one or more layers formed of or comprising composition(s) of the present disclosure. Rotomolding or rotational molding involves adding an amount of material to a mold, heating and slowly rotating the mold so that the softened material coats the walls of the mold. The mold continues to rotate at all times during the heating phase, thus maintaining even thickness throughout the part and preventing any deformation during the cooling phase. Examples of rotomolded products include but are not limited to furniture, toys, tanks, road signs tornado shelters, containers including United Nations-approved containers for the transportation of nuclear fissile materials.

Aspects

The present disclosure provides, among others, the following aspects, each of which may be considered as optionally including any alternate aspects.

Clause 1. A composition comprising:
  (i) one or more ethylene polymers;
  (ii) one or more vinyl alcohol polymers, one or more polyamides, or a combination thereof; and (iii) one or more polar polymers, one or more grafted polyolefins, or a combination thereof.

Clause 2. The composition of Clause 1, further comprising one or more polypropylene polymers.

Clause 3. The composition of Clauses 1 or 2, further comprising one or more propylene-based elastomers.

Clause 4. The composition of any of Clauses 1 to 3, wherein the composition comprises a polar polymer selected from an ethylene-acrylic-acid-copolymer, ethylene acrylate copolymer, an ethylene polyvinyl acetate, or combination(s) thereof.

Clause 5. The composition of Clause 4, wherein the composition comprises an ethylene-acrylic-acid-copolymer having an acrylic acid content of from about 11 wt % to 15 wt %.

Clause 6. The composition of any of Clauses 1 to 5, wherein the composition comprises a grafted polyolefin that is a grafted propylene-based elastomer.

Clause 7. The composition of any of Clause 6, wherein the propylene-based elastomer is the grafted product of a propylene-based elastomer and a maleic anhydride grafting monomer.

Clause 8. The composition of Clauses 6 or 7, wherein the propylene-based elastomer has an ethylene content from about 14 mole % to 21 mole %.

Clause 9. The composition of any of Clauses 6 to 8, wherein the propylene-based elastomer has a propylene content of from about 92 mole % to about 68 mole %.

Clause 10. The composition of any of Clauses 6 to 8, wherein greater than 80% of the propylene of the grafted propylene-based elastomer is isotactic as measured by mm triad of $^{13}C$ NMR.

Clause 11. The composition of any of Clauses 6 to 10, wherein the propylene-based elastomer has a weight average molecular weight of from about 80,000 g/mol to about 500,000 g/mol.

Clause 12. The composition of any of Clauses 6 to 10, wherein the propylene-based elastomer has a Mooney viscosity ML (1+4)@125° C. less than 100.

Clause 13. The composition of Clause 12, wherein the propylene-based elastomer has a Mooney viscosity ML (1+4)@125° C. less than 30.

Clause 14. The composition of any of Clauses 6 to 13, wherein the propylene-based elastomer has a density of from about 0.85 g/cm$^3$ to about 0.9 g/cm$^3$, according to ASTM D1505.

Clause 15. The composition of any of Clauses 6 to 14, wherein the propylene-based elastomer has a density of from about 0.855 g/cm$^3$ to about 0.875 g/cm$^3$, according to ASTM D1505.

Clause 16. The composition of any of Clauses 6 to 15, wherein the propylene-based elastomer has one or more of the following properties:
  (1) an ethylene content of about 16 wt % with the balance being propylene,
  (2) a density of about 0.862 g/cm$^3$ (ASTM D1505),
  (3) a melt index of about 1.4 g/10 min (ASTM D1238; 190° C., 2.16 kg), and
  (4) a melt mass flow rate of about 3 g/10 min (230° C., 2.16 kg).

Clause 17. The composition of any of Clauses 6 to 16, wherein the grafted propylene-based elastomer has a maleic anhydride concentration of from about 0.4 wt % to about 2 wt %, based on the total weight of the grafted propylene-based elastomer.

Clause 18. The composition of any of Clauses 6 to 17, wherein the grafted propylene-based elastomer has a melt flow rate of about 52 or less g/10 min., per ASTM D1238 (190° C.; 2.16 kg).

Clause 19. The composition of Clause 18, wherein the grafted propylene-based elastomer has a melt flow rate of from about 20 g/min to about 52 g/min, per ASTM D1238 (190° C.; 2.16 kg).

Clause 20. The composition of any of Clauses 1 to 19, wherein the composition comprises a grafted polyolefin that is a grafted ethylene-based plastomer and/or a grafted high-density polyethylene.

Clause 21. The composition of any of Clauses 1 to 19, wherein the composition comprises grafted propylene-based elastomer and grafted ethylene-based plastomer.

Clause 22. The composition of any of Clauses 20 to 21, wherein the grafted ethylene-based plastomer has at least one of the following properties:
  a density of from about 0.86 g/cm$^3$ to about 0.90 g/cm$^3$,
  a melt index of from about 6 to about 12 g/10 min (230° C., 10.0 kg),
  a melt index of from about 1 g/10 min to about 22 g/10 min (230° C., 5.0 kg), and
  a grafting level of from about 0.2 wt % to about 1 wt %.

Clause 23. The composition of any of Clauses 1 to 20, wherein the composition comprises grafted propylene-based elastomer and grafted high-density polyethylene.

Clause 24. The composition of any of Clauses 20 or 23, wherein the grafted high-density polyethylene has one or more of the following properties:
  a density of from about 0.95 g/cm$^3$ to about 0.97 g/cm$^3$,
  an MFR (190° C., 1.2 kg) of from about 1.5 g/10 min to about 6.5 g/10 min, and
  a grafting level of from about 0.1 wt % to about 0.5 wt %.

Clause 25. The composition of any of Clauses 1 to 24, wherein the composition comprises a grafted polyolefin that is a grafted polypropylene homopolymer having one or more of the following properties:
  a density of from about 0.89 g/cm$^3$ to about 0.91 g/cm$^3$,
  an MFR (190° C., 1.2 kg) of from about 80 g/10 min to about 170 g/10 min, and
  a grafting level of from about 0.5 wt % to about 1 wt %.

Clause 26. The composition of any of Clauses 1 to 25, wherein the vinyl alcohol polymer or polyamide has an MFR (2.16 kg, 230° C.) of from about 0.5 to about 10 g/10 min.

Clause 27. The composition of any of Clauses 1 to 26, wherein the vinyl alcohol polymer or polyamide has a density at 23° C. of from about 1.10 g/cm$^3$ to about 1.21 g/cm$^3$.

Clause 28. The composition of any of Clauses 1 to 27, wherein the vinyl alcohol polymer or polyamide is selected from a polyamide (PA), a poly(vinyl alcohol) copolymer (PVOH), a ethylene vinyl alcohol copolymers (EVOH), or blend(s) thereof.

Clause 29. The composition of any of Clauses 2 to 28, wherein the composition comprises a combined amount of the polyethylene and the polypropylene from about 60 wt % to about 95 wt %, based on the total weight of the composition.

Clause 30. The composition of any of Clauses 1 to 29, wherein the composition comprises an amount of the polar polymer or grafted polyolefin of from about 1 wt % to about 7 wt %, based on the total weight of the composition.

Clause 31. The composition of any of Clauses 1 to 30, wherein the composition comprises an amount of the vinyl alcohol polymer or polyamide of from about 0.2 wt % to about 36 wt %.

Clause 32. The composition of any of Clauses 2 to 31, wherein the composition has a ratio (by weight) of (polyethylene+polypropylene) to (polar polymer or grafted polyolefin) from about 95:5 to about 75:25.

Clause 33. The composition of any of Clauses 1 to 32, wherein the composition has a ratio (by weight) of (vinyl alcohol polymer or polyamide) to (polar polymer or grafted polyolefin) from about 89:11 to about 66:34.

Clause 34. The composition of any of Clauses 1 to 33, wherein a ratio (by weight) of (polyethylene+polypropylene) to (vinyl alcohol polymer or polyamide) from about 75:25 to about 50:50.

Clause 35. The composition of any of Clauses 1 to 34, wherein the composition comprises a vinyl alcohol polymer that is EVOH, and the composition comprises a polyamide that is polyamide, wherein the ratio (by weight) of polyamide to EVOH is from about 100:0 to about 0:100.

Clause 36. The composition of any of Clauses 1 to 35, wherein the composition has a Notched Charpy impact strength at 23° C. of 8 kJ/m² or greater, according to ISO 179-1/1eA.

Clause 37. The composition of Clause 36, wherein the composition has a Notched Charpy impact strength at 23° C. of from about 30 kJ/m² to about 40 kJ/m², according to ISO 179-1/1eA.

Clause 38. The composition of any of Clauses 1 to 37, wherein a portion of the composition having an area of 1 mm² has a submicron domain content of 50% or greater per mm², based on the total number of microdomains of the portion, according to Scanning Electron Microscopy.

Clause 39. The composition of Clause 38, wherein a portion of the composition having an area of 1 mm² has a submicron domain content of 90% or greater per mm², based on the total number of microdomains of the portion, according to Scanning Electron Microscopy.

Clause 40. A film comprising the composition of any of Clauses 1 to 39.

Clause 41. The film of Clause 40, wherein the film has a thickness of from about 10 μm to about 150 μm.

Clause 42. The film of Clauses 40 or 41, wherein the melt from such film has a melt strength of from about 5 to about 540 cN, when measured at 190° C.

Clause 43. The film of Clause 40, wherein the melt from such film has an averaged 1% Secant Modulus (M), at 23° C. according to modified ASTM D882-18, of from about 170 MPa to about 520 MPa.

Clause 44. The film of any of Clauses 40 to 43, wherein the film has an Elmendorf Tear (MD) value, in accordance with ASTM D-1922, of from about 15 g/mil to about 250 g/mil.

Clause 45. The film of any of Clauses 40 to 44, wherein the film has an Elmendorf Tear (TD) value, in accordance with ASTM D-1922, of from about 200 g/mil to about 760 g/mil.

Clause 46. The film of any of Clauses 40 to 45, wherein the film has a Dart Drop Impact, in accordance with ASTM D-1709, method A, of from about 25 g/mil to about 190 g/mil.

Clause 47. The film of any of Clauses 40 to 46, wherein the film has an Elongation at Break (MD) of from about 350% to about 750%, in accordance with modified ASTM D882-18.

Clause 48. The film of any of Clauses 40 to 47, wherein the film has an Elongation at Break (TD) of from about 9% to about 720%, in accordance with modified ASTM D882-18.

Clause 49. The film of any of Clauses 40 to 48, wherein the film has a puncture energy at break energy, in accordance with CEN 14477, of about 0.0.033 mJ/μm to about 0.012 mJ/μm.

Clause 50. The film of any of Clauses 40 to 49, wherein the film has a force at break energy (MD), in accordance with modified ASTM D882-18, of from about 20 MPa to about 45 MPa.

Clause 51. The film of any of Clauses 40 to 50, wherein the film has a force at break energy (TD), in accordance with modified ASTM D882-18, of from about 9 MPa to about 40 MPa.

Clause 52. The film of any of Clauses 40 to 51, wherein the film has a puncture maximum, in accordance with CEN 14477, of from about 25 mN/μm to about 47 mN/μm.

Clause 53. The film of any of Clauses 40 to 52, wherein the film has a puncture E break, in accordance with CEN 14477, of from about 1.8 mm to about 3.9 mm.

Clause 54. The film of any of Clauses 40 to 53, wherein the film has a haze value of 35% or less, in accordance with ASTM D-1003.

Clause 55. The film of Clause 54, wherein the film has a haze value of 15% or less, in accordance with ASTM D-1003.

Clause 56. The film of any of Clauses 40 to 55, wherein the film has a clarity of about 80% or greater, in accordance with ASTM D1746.

Clause 57. The film of Clause 56, wherein the film has a clarity of about 90% or greater, in accordance with ASTM D1746.

Clause 58. The film of any of Clauses 40 to 57, wherein the film has a gloss of about 50% or greater, in accordance with ASTM D-2457.

Examples

Composition Components:

Granules containing PE [from 36 to 90 wt %] and PP [from 0 to 18.2 wt %] with PA [from 0 to 27.3 wt %] and EVOH [from 0 to 9.1 wt %]. The PE used was PE LL1001 AV (Lot: 7066029) from ExxonMobil. The PP used was Achieve Advanced PP0502E1 (Lot:15E11PCB). The PA used was PA 6 Ultramid B40L (50080984 ABL 65704347G0) from BASF. The EVOH used was EVOH L171 B (Lot: L6DA71) from EVAL Europe.

Compatibilizers:

Various compatibilizers were tested.
1) Escor™ 5200 ethylene-acrylic-acid-copolymer-resin grades with an acrylic acid content of typically 15.0 wt % and melt index of typically 38 g/10 min (190° C./2.16 kg) was tested.
2) Optema™ TC 120 ethylene methyl acrylate copolymer resin, with a methyl acrylate content of typically 21.5 wt % and melt index of typically 6.0 g/10 min (190° C./2.16 kg) was tested.
3) Exxelor™ VA1840 ethylene copolymers functionalized with maleic anhydride with a medium grafting level [from 0.2 to 0.5 wt % maleic anhydride] and melt flow rate of typically 8.0 g/10 min (230° C./5.0 kg) was tested.
4) Grafted Vistamaxx™ 6102 propylene-based elastomer with an ethylene content of typically 16% and grafted with maleic anhydride with a grafting level of from typically 0.4 to 1.5 wt % maleic anhydride and an MFR of typically 10 to 30 g/10 min (190° C./1.2 kg) or 24.9 to 51.5 g/10 min (190° C./2.16 kg).

5) Vistamaxx™ 6102 propylene-based elastomer with an ethylene content of typically 16% was tested as co-compatibilizer.
6) Retain 3000 from Dow Chemical Company, an ethylene copolymer functionalized with maleic anhydride with a grafting level [approximately 1.2 wt % maleic anhydride] and melt flow rate of typically 660 g/10 min (190° C./2.16. kg) was tested.

TABLE 1

| Sample | PE LL1001 | PA6 | EVOH | PP | Antioxidant master batch | Bynel tie layer | Compatibilizer |
|---|---|---|---|---|---|---|---|
| Pure PE LL1001 | 95.24% | 0.00% | 0.00% | 0.00% | 2.38% | 2.38% | 0.00% |
| PE/PA | 63.64% | 27.27% | 0.00% | 0.00% | 2.27% | 2.27% | 4.55% |
| PE/EVOH | 81.82% | 0.00% | 9.09% | 0.00% | 2.27% | 2.27% | 4.55% |
| PE/PA/EVOH | 54.55% | 27.27% | 9.09% | 0.00% | 2.27% | 2.27% | 4.55% |
| PE/PA/EVOH/PP | 36.36% | 27.27% | 9.09% | 18.18% | 2.27% | 2.27% | 4.55% |

Blown Film Trial:

The selected compatibilizers were compounded into the polymer with the composition described above in Table 1. Monolayer films were produced with the following conditions:

Thickness: 40-50 μm
BUR: 2.5
Die gap: 1.0 mm
Output: 15 kg/h
Melt temperature: from 210 to 260° C., typically 230° C.

TABLE 2

| Formulation No. | Composition | Compatibilizers/Additives |
|---|---|---|
| F1 | Reference - PE compounded | 0% |
| F2 | Compounded barrier film materials containing approximately 67 wt % PE, 29 wt % PA, 4 wt % additives including tie layer | 0 wt % as reference for compounded barrier film made from PE and PA |
| F3 | 95 wt % of compounded barrier film materials containing approximately 67 wt % PE, 29 wt % PA, 4 wt % additives including tie layer | 5 wt % Grafted Vistamaxx™ 6102 propylene-based elastomer functionalized with maleic anhydride |
| F4 | | 5 wt % Optema™ TC 120 ethylene-methyl-acrylate-copolymer resin |
| F5 | | 5 wt % Exxelor VA1840 ethylene copolymers functionalized with maleic anhydride |
| F6 | | 5 wt % Escor 5200 ethylene-acrylic-acid-copolymer resin |
| F7 | Compounded barrier film materials containing approximately 86 wt % PE, 10 wt % EVOH, 4 wt % additives including tie layer | Reference for compounded barrier film made from PE and EVOH |
| F8 | 95 wt % of compounded barrier film materials containing approximately 86 wt % PE, 10 wt % EVOH, 4 wt % additives including tie layer | 5 wt % Grafted Vistamaxx™ 6102 propylene-based elastomer functionalized with maleic anhydride |
| F9 | | 5 wt % Optema™ TC 120 ethylene-methyl-acrylate-copolymer resin |
| F10 | | 5 wt % Exxelor VA1840 ethylene copolymers functionalized with maleic anhydride |
| F11 | | 5 wt % Escor 5200 ethylene-acrylic-acid-copolymer resin |
| F12 | Compounded barrier film materials containing approximately 57 wt % PE, 29 wt % PA, 10 wt % EVOH 4 wt % additives including tie layer | 0 wt % as reference for compounded barrier film made from PE, PA, and EVOH |
| F13 | 95 wt % of compounded barrier film materials containing approximately 57 wt % PE, 29 wt % PA, 10 wt % EVOH 4 wt % additives including tie layer | 5 wt % Grafted Vistamaxx™ 6102 propylene-based elastomer functionalized with maleic anhydride |
| F14 | Compounded barrier film materials containing approximately 57 wt % PE, 29 wt % PA, 10 wt % EVOH 4 wt % additives including tie layer | 5 wt % Optema™ TC 120 ethylene-methyl-acrylate-copolymer resin |
| F15 | 95 wt % of compounded barrier film materials containing approximately 57 wt % PE, 29 wt % PA, 10 wt % EVOH 4 wt % additives including tie layer | 5 wt % Exxelor VA1840 ethylene copolymers functionalized with maleic anhydride |
| F16 | | 5 wt % Escor 5200 ethylene-acrylic-acid-copolymer resin |

Film Properties:
Mechanical Properties:

TABLE 3

| Test | Test method | Properties | EM Test | Test method norm | Modifications | Justification of deviation |
|---|---|---|---|---|---|---|
| Elmendorf Tear | ASTM D1922 | Tear Machine direction [g] Tear Transverse Direction [g] | Elmendorf tear | ASTM D1922-15 | None - Fully conform | None |
| Puncture Resistance: needle Zwick method | Modified BSI CEN 14477 | Maximum F [mN] ε break [mm] Energy at break [mJ] | Needle Puncture | BSI CEN 14477 | One deviation: Section 5 - pp. 7: "The specimens shall be conditioned at 23 ± 2° C. and 50 ± 5% RH for 48 hours before testing". | In the lab ASTM D618 is followed for conditioning. This test norm states conditioning parameters of 23 ± 2° C. and 50 ± 10% RH for 40 hours before testing. |
| Tensile properties | Modified ASTM D-882 | 1% Modulus MD [MPa] 1% Modulus TD [MPa] Elongation at break MD [%] Elongation at break TD [%] Force at break MD [MPa] Force at break TD [MPa] | Tensile properties | ASTM D882-18 | Two deviations: 1. Section 7.7 - pp. 3: "For tensile modulus of elasticity determinations, a specimen gage length of 250 mm (10 in.) shall be considered as standard." 2. Section 11.3 - pp. 5: "Set the initial grip separation in accordance to Table 1." According to Table 1, the initial grip separation needs to be adjusted according to the percent elongation at break. | 1. A gauge length of 50 mm is used for all specimens. At this gauge length the samples are not slipping and therefore the results are not influenced. Strain rate is 10% min$^{-1}$ which is compliant to the norm. 2. The initial grip separation is always set to 50 mm. Deviation to the norm is observed when sample elongates less than 100%. In other cases, we are compliant with the norm. |
| Dart impact | Method A of ASTM D1709 | Impact failure [g] | Dart impact | ASTM D1709 | None - Fully conform | None |

TABLE 4

| Sample | Thickness [μm] | 1% Modulus MD [MPa] | Elongation at break MD [%] | Force at break MD [MPa] | 1% Modulus TD [MPa] | Elongation at break TD [%] | Force at break TD [MPa] |
|---|---|---|---|---|---|---|---|
| F1 | 44.6 | 234 | 774 | 39.9 | 303 | 742 | 39.1 |
| F2 | 40.5 | 377 | 374 | 38.3 | 344 | 236 | 14.1 |
| F3 | 53.3 | 209 | 540 | 26.6 | 249 | 469 | 22.4 |
| F4 | 45.5 | 309 | 385 | 37.6 | 294 | 232 | 10.8 |
| F5 | 41.6 | 225 | 454 | 44.2 | 296 | 525 | 29.3 |
| F6 | 49.7 | 289 | 386 | 37.8 | 362 | 480 | 21.0 |
| F7 | 43.6 | 340 | 723 | 32.0 | 349 | 675 | 28.6 |
| F8 | 56 | 179 | 661 | 27.1 | 218 | 714 | 24.4 |
| F9 | 51 | 352 | 748 | 33.6 | 308 | 639 | 21.4 |
| F10 | 47.9 | 288 | 687 | 34.3 | 303 | 713 | 34.6 |
| F11 | 51.6 | 249 | 641 | 28.2 | 336 | 717 | 28.8 |
| F12 | 41.5 | 263 | 378 | 45.6 | 245 | 155 | 11.2 |
| F13 | 51.1 | 233 | 412 | 28.5 | 262 | 410 | 23.4 |
| F14 | 45.5 | 268 | 406 | 39.3 | 283 | 9 | 9.1 |
| F15 | 52.6 | 280 | 471 | 44.6 | 337 | 358 | 19.7 |
| F16 | 47.3 | 364 | 395 | 42 | 359 | 362 | 16.7 |

| Sample | Tear Machine direction [g] | Tear Transverse Direction [g] | Puncture maximum F [mN] | Puncture Energy at break [mJ] | Puncture ε break [mm] | Impact failure [g] |
|---|---|---|---|---|---|---|
| F1 | 288 | 488 | 2204 | 6.02 | 4.23 | 164.2 |
| F2 | 155.2 | 635 | 2162 | 3.48 | 2.67 | 76.4 |
| F3 | 351.4 | 459.8 | 1676 | 2.25 | 2.19 | 326.2 |
| F4 | 103.1 | 804.3 | 1866 | 2.82 | 2.48 | 55.4 |
| F5 | 170.1 | 488 | 1964 | 3.08 | 2.57 | 197.2 |
| F6 | 94 | 681.6 | 2253 | 4.34 | 2.96 | 147.7 |
| F7 | 325 | 552 | 1852 | 1.3 | 2.79 | 110.7 |
| F8 | 487.6 | 566.1 | 1853 | 3.08 | 2.65 | 219.7 |
| F9 | 350.4 | 710.4 | 2294 | 5.88 | 3.90 | 83.9 |
| F10 | 351.2 | 504.8 | 1837 | 3.4 | 2.92 | 195.7 |
| F11 | 479.1 | 776.3 | 1428 | 1.72 | 1.95 | 113.2 |
| F12 | 36.1 | — | 1723 | 1.9 | 1.85 | — |
| F13 | 195 | 511.4 | 1603 | 2.35 | 2.21 | — |

TABLE 4-continued

| F14 | 35.4 | — | 1686 | 1.76 | 1.83 | — |
| F15 | 143.2 | — | 1872 | 42.8 | 2.60 | 56.5 |
| F16 | 39.7 | 1577.3 | 1901 | 2.74 | 2.23 | — |

Formulation F3 shows superior toughness—Elmendorf tear resistance and dart impact resistance—compared to formulation F2, the reference without compatibilizing additive, and similar to formulation F1, the reference for pure polyethylene. Similarly, formulation F9 and F10 upgrade the overall mechanical properties and the toughness of the material, respectively, in comparison to formulation F7, the reference without compatibilizing additive.

Scanning Electron Microscopy Results:
Equipment:
  Coater: Cressington208HR Sputter Coater and Specimen Preparation for SEM
  Focused Ion Beam—Scanning Electron Microscope (FIB-SEM) FEI Helios NanoLabG3 UC
  Analysis:
  All micrographs have been recorded with the through-lens detector in backscatter mode (TLD-BSE), unless stated otherwise. The detector is always indicated on the data bar of the image. The imaging parameters were: 2 kV and 0.4 nA at working distance of 4 mm
  Results:
  While there did not appear to be much of a difference for compatibilized PE/EVOH structures, the compatibilized PE/PA structures show a seemingly different compatibilization as compared to films using Retain 3000 as a compatibilizer. For example, the domain sizes of the dispersed face as well as their distribution are both broader when using Retain 3000 as compatibilizer. Moreover, for inventive compositions using grafted Vistamaxx, the interface between PA and PE showed a highly stained corona. In addition, the staining (performed with $RuO_4$) appeared to be reversed when Retain 3000 was used as compatibilizer where the interface was free of a highly stained corona. In addition, cross sections illustrated that compositions having grafted Vistamaxx™ 6102 had a domain size that was much more uniformly distributed, ranging around 1 micron or less, whereas the Retain 3000 formulations provided a larger domain size and less uniform size distribution. For Escor™ 5200, the stretched domains were up to 3 µm in length and up to 1 µm in width. For Vistamaxx, all domain sizes were about 500 nm or less. Taken together, and without being bound by theory, it is believed that compositions having the compatibilizer Retain 3000 have a different compatibilization mechanism than the inventive compositions containing PE, PA, and grafted polyolefin.

Shear Studies:
Mixing can happen under processing conditions. Under processing conditions, the polymer blends experience shear thinning which is related to the composition of the blend. Some materials such as metallocene-PE (mPE) with high alpha-olefin content without long chain branching experience less shear thinning than other materials such as polypropylene. If a low viscosity is desired under processing conditions, there are consequently different paths: a) starting with mPE-based compatibilizers with very low viscosity but little shear thinning or b) starting with higher viscosity but also higher shear thinning such as e.g. for grafted Vistamaxx- or plastomer-based Exxelor-based solutions. In both scenarios one can obtain a desired low viscosity under processing conditions (which in fact can be important).

This has been quantified at 220° C. for the polymer mixture of PE/PA (70/30) as shown below in Table 5. Without shear, the LLDPE/PA6-blend (70/30 by weight) with 5 wt % Retain 3000 has the lowest viscosity, which is up to 4.5 times lower than for the inventive compatibilizer compositions. However, under processing conditions, there is hardly any difference because the inventive compositions exhibit much more shear thinning.

Rheology experiments were performed following "RHE 17-1.5: "Measurement of the dynamic moduli of molten polymers by frequency scans on ARES and ARES-Br." Dynamic frequency scans at 220° C. were carried out on ARES instrument. A nitrogen atmosphere was used to avoid oxidative degradation. Plate-plate geometry with a 25 mm diameter was utilized. Strain was kept low (=10%) to test within the linear visco-elastic region. Frequency was varied between 100 rad/s and 0.02 rad/s with 5 points measured/decade.

TABLE 5

| | Viscosity/Pa*s | | | | |
| --- | --- | --- | --- | --- | --- |
| Shear rate/ rad/s | Retain 3000 | Escor 5200 | Grafted Vistamaxx | Exxelor VA1840 | no compatibilizer |
| 0 | 10581 | 14051 | 37551 | 46168 | 25853 |
| 40 | 1255 | 1295 | 1426 | 1391 | 1439 |
| 100 | 834 | 861 | 917 | 830 | 965 |

| | Reduction factor vs zero shear viscosity | | | | |
| --- | --- | --- | --- | --- | --- |
| Shear rate | Retain 3000 | Escor 5200 | Grafted Vistamaxx | Exxelor VA1840 | no compatibilizer |
| 40 rad/s | 8.4 | 10.9 | 26.3 | 33.2 | 18.0 |
| 100 rad/s | 12.7 | 16.3 | 41.0 | 55.6 | 26.8 |

Injection Molding Trials:
FIG. 1 is a radar plot of measured injection molding features for products comprising compositions of the present disclosure as compared to a comparative polymer, according to an embodiment. The compositions of this trial included PE, PP, EVOH, and PA with optionally 5 wt % of a compatibilizer (Exxelor VA1840 or grafted Vistamaxx propylene-based elastomer). Overall, compositions from PE, PP, EVOH, and PA (without compatibilizer) have weak mechanical properties even in injection molding. In addition, grafted Vistamaxx propylene-based elastomer is a good compatibilizer for PE/PA/EVOH/PP mixtures, increasing the toughness in terms of Energy (Charpy) by factor 8.

TABLE 6

| Description | E-modulus MPa | Fmax MPa | Breakpoint MPa | Elongation to break % | Energy to break J | Energy @ Fmax J | Flexural E-Modulus MPa | Flexural 1% modulus MPa | Energy kJ/m² |
|---|---|---|---|---|---|---|---|---|---|
| pure LLDPE LL1001 | 211.00 | 16.0 | 15.10 | 471.4 | 166.700 | 163.76 | 202 | 173 | 70.43 |
| PE/PA no comp. (66.66 wt % PE, 28.57 wt % PA, 2.38 wt % AO25 antioxidant masterbatch, 2.38 wt % Bynel tie layer) | 630.48 | 22.0 | 20.78 | 285.8 | 174.403 | 165.85 | 560 | 507 | 93.94 |
| PE/PA with Escor 5200 and Vistamaxx 6102 (60.9 wt % PE, 26.1 wt % PA, 4.35 wt % Escor 5200, 4.35 wt % Vistamaxx 6102, 2.17 wt % AO25 antioxidant masterbatch, 2.17 wt % Bynel tie layer) | 430.66 | 18.2 | 17.10 | 209.5 | 107.788 | 99.77 | 413 | 370 | 93.64 |
| PE/PA with 10 wt % Escor 5200 (60.9 wt % PE, 26.1 wt % PA, 8.70 wt % Escor 5200, 2.17 wt % AO25 antioxidant masterbatch, 2.17 wt % Bynel tie layer) | 444.59 | 17.8 | 16.38 | 154.9 | 79.644 | 72.60 | 400 | 359 | 82.21 |
| PE/PA with Escor 5200 (63.64 wt % PE, 27.27 wt % PA, 2.27 wt % AO25 antioxidant masterbatch, 2.27 wt % Bynel tie layer, 4.55 wt % compatibilizer) | 549.27 | 20.8 | 20.00 | 282.1 | 166.594 | 158.80 | 487 | 439 | 93.01 |
| PE/PA with grafted Vistamaxx (63.64 wt % PE, 27.27 wt % PA, 2.27 wt % AO25 antioxidant masterbatch, 2.27 wt % Bynel tie layer, 4.55 wt % compatibilizer) | 259.59 | 18.4 | 17.92 | 354.0 | 163.490 | 160.77 | 248 | 214 | 83.32 |
| PE/PA with Retain 3000 (63.64 wt % PE, 27.27 wt % PA, 2.27 wt % AO25 antioxidant masterbatch, 2.27 wt % Bynel tie layer, 4.55 wt % compatibilizer) | 455.60 | 18.1 | 17.13 | 219.7 | 112.889 | 105.51 | 405 | 356 | 86.85 |

Note:
PE/PA is 70/30 (by weight). To the polymer mixture, 2.5 wt % AO25 and 2.5 wt % Bynel tie layer were added.

TABLE 7

| Description | E-modulus MPa | $F_{max}$ MPa | Break point MPa | Elongation to break % | Energy to break J | Energy @ $F_{max}$ J | Flexural E-Modulus MPa | Flexural 1% modulus MPa | Energy kJ/m² |
|---|---|---|---|---|---|---|---|---|---|
| pure LLDPE LL1001 | 211.00 | 16.0 | 15.10 | 471.4 | 166.700 | 163.76 | 202 | 173 | 70.43 |
| PE/PA/EVOH/PP no comp. (38.10 wt % PE, 28.57 wt % PA, 19.05 wt % PP, 2.38 wt % AO25 antioxidant masterbatch, 2.38 wt % Bynel tie layer) | 1272.26 | 27.5 | 16.85 | 49.1 | 37.997 | 5.640 | 1025 | 969 | 10.24 |
| PE/PA/EVOH/PP Exxelor (36.36 wt % PE, 27.27 wt % PA, 18.18 wt % PP, 2.27 wt % AO25 antioxidant masterbatch, 2.27 wt % Bynel tie layer, 4.55 wt % compatibilizer) | 791.20 | 23.2 | 21.74 | 145.1 | 97.665 | 86.83 | 687 | 636 | 18.71 |
| PE/PA/EVOH/PP EXP181 (36.36 wt % PE, 27.27 wt % PA, 18.18 wt % PP, 2.27 wt % AO25 antioxidant masterbatch, 2.27 wt % Bynel tie layer, 4.55 wt % compatibilizer) | 532.46 | 22.2 | 21.93 | 288.8 | 169.941 | 167.56 | 528 | 463 | 80.71 |

Note:
PE/PA/EVOH/PP is 40/30/10/20 (by weight). To the polymer mixture, 2.5 wt % AO25 and 2.5 wt % Bynel tie layer were added.

Overall, compositions and methods of the present disclosure can provide compositions comprising a polar polymer and/or a grafted polyolefin to provide enhanced composition properties such as mechanical properties and optical properties. The polar polymer and/or grafted polyolefin can be added to the composition at any suitable stage of composition formation (not necessarily as part of a layer of a recycled barrier structure) which provides a more uniform morphology of the recycled material and ultimately improved mechanical properties of the recycled material.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A composition comprising:
   (i) one or more ethylene polymers;
   (ii) one or more vinyl alcohol polymers, one or more polyamides, or a combination thereof; and
   (iii) at least one grafted propylene-based elastomer.

2. The composition of claim 1, further comprising one or more polypropylene polymers.

3. The composition of claim 1, further comprising one or more propylene-based elastomers.

4. The composition of claim 1, wherein the composition further comprises a polar polymer selected from an ethylene-acrylic-acid-copolymer, ethylene acrylate copolymer, an ethylene polyvinyl acetate, and combination(s) thereof.

5. The composition of claim 4, wherein the composition comprises an ethylene-acrylic-acid-copolymer having an acrylic acid content of from about 11 wt % to 15 wt %.

6. The composition of claim 1, wherein the propylene-based elastomer is the grafted product of a propylene-based elastomer and a maleic anhydride grafting monomer.

7. The composition of claim 1, wherein the propylene-based elastomer has an ethylene content from about 14 mole % to 21 mole %.

8. The composition of claim 1, wherein the propylene-based elastomer has a weight average molecular weight of from about 80,000 g/mol to about 500,000 g/mol.

9. The composition of claim 1, wherein the propylene-based elastomer has a Mooney viscosity ML (1+4)@125° C. less than 30.

10. The composition of claim 1, wherein the propylene-based elastomer has a density of from about 0.85 g/cm³ to about 0.9 g/cm³, according to ASTM D1505.

11. The composition of claim 1, wherein the propylene-based elastomer has one or more of the following properties:
   (1) an ethylene content of about 16 wt % with the balance being propylene,
   (2) a density of about 0.862 g/cm$^3$ (ASTM D1505),
   (3) a melt index of about 1.4 g/10 min (ASTM D1238; 190° C., 2.16 kg), and
   (4) a melt mass flow rate of about 3 g/10 min (230° C., 2.16 kg).

12. The composition of claim 1, wherein the grafted propylene-based elastomer has a maleic anhydride concentration of from about 0.4 wt % to about 2 wt %, based on the total weight of the grafted propylene-based elastomer.

13. The composition of claim 1, wherein the grafted propylene-based elastomer has a melt flow rate of from about 20 g/min to about 52 g/min, per ASTM D1238 (190° C.; 2.16 kg).

14. The composition of claim 1, wherein the composition further comprises a grafted ethylene-based plastomer and/or a grafted high-density polyethylene.

15. The composition of claim 1, wherein the composition further comprises a grafted ethylene-based plastomer.

16. The composition of claim 1, wherein the composition further comprises grafted high-density polyethylene.

17. The composition of claim 1, wherein the composition further comprises a grafted polypropylene homopolymer having one or more of the following properties:
   a density of from about 0.89 g/cm$^3$ to about 0.91 g/cm$^3$,
   an MFR (190° C., 1.2 kg) of from about 80 g/10 min to about 170 g/10 min, and
   a grafting level of from about 0.5 wt % to about 1 wt %.

18. The composition of claim 2, wherein the composition comprises a combined amount of the polyethylene and the polypropylene from about 60 wt % to about 95 wt %, based on the total weight of the composition.

19. The composition of claim 1, wherein the amount of the propylene-based elastomer in the composition is about 1 wt % to about 7 wt %, based on the total weight of the composition.

20. The composition of claim 1, wherein the composition comprises an amount of the vinyl alcohol polymer or polyamide of from about 0.2 wt % to about 36 wt %.

21. The composition of claim 2, wherein the composition has a ratio (by weight) of (polyethylene+polypropylene) to (grafted propylene-based elastomer) from about 95:5 to about 75:25.

22. The composition of claim 1, wherein the composition has a ratio (by weight) of (vinyl alcohol polymer or polyamide) to (grafted propylene-based elastomer) from about 89:11 to about 66:34.

23. The composition of claim 1, wherein a ratio (by weight) of (polyethylene+polypropylene) to (vinyl alcohol polymer or polyamide) from about 75:25 to about 50:50.

24. The composition of claim 1, wherein the composition comprises a vinyl alcohol polymer that is EVOH, and the composition comprises a polyamide, wherein a ratio (by weight) of the polyamide to EVOH is from about 100:0 to about 0:100.

25. The composition of claim 1, wherein a portion of the composition having an area of 1 mm$^2$ has a submicron domain content of 90% or greater per mm$^2$, based on the total number of microdomains of the portion, according to Scanning Electron Microscopy.

26. A film comprising the composition of claim 1.

27. The film of claim 26, wherein the melt from such film has a melt strength of from about 5 to about 540 cN, when measured at 190° C.

28. The film of claim 26, wherein the melt from such film has an averaged 1% Secant Modulus (M), at 23° C. according to modified ASTM D882-18, of from about 170 MPa to about 520 MPa.

29. The film of claim 26, wherein the film has one or more of the following properties:
   (a) an Elmendorf Tear (MD) value, in accordance with ASTM D-1922, of from about 15 g/mil to about 250 g/mil;
   (b) an Elmendorf Tear (TD) value, in accordance with ASTM D-1922, of from about 200 g/mil to about 760 g/mil;
   (c) a Dart Drop Impact, in accordance with ASTM D-1709, method A, of from about 25 g/mil to about 190 g/mil;
   (d) an Elongation at Break (MD) of from about 350% to about 750%, in accordance with modified ASTM D882-18;
   (e) an Elongation at Break (TD) of from about 9% to about 720%, in accordance with modified ASTM D882-18;
   (f) a puncture energy at break energy, in accordance with CEN 14477, of about 0.0.033 mJ/μm to about 0.012 mJ/μm;
   (g) a force at break energy (MD), in accordance with modified ASTM D882-18, of from about 20 MPa to about 45 MPa;
   (h) a force at break energy (TD), in accordance with modified ASTM D882-18, of from about 91 MPa to about 40 MPa;
   (i) a puncture maximum, in accordance with CEN 14477, of from about 25 mN/μm to about 47 mN/μm;
   (j) a puncture ε break, in accordance with CEN 14477, of from about 1.8 mm to about 3.9 mm;
   (k) a haze value of 15% or less, in accordance with ASTM D-1003;
   (l) a clarity of about 90% or greater, in accordance with ASTM D1746; and
   (m) a gloss of about 50% or greater, in accordance with ASTM D-2457.

30. The composition of claim 1, wherein the amount of the propylene-based elastomer in the composition is about 0.2 wt % to about 20 wt %, the propylene-based elastomer comprises about 68 mol % to about 92 mol % propylene-derived units and about 8 mol % to about 32 mol % ethylene-derived units, based upon the entire weight of the propylene-based elastomer, and wherein the propylene-based elastomer has a triad tacticity of greater than 80%, a melt enthalpy, as determined by DSC, of about 1 J/g to about 50 J/g, and a melting point, as measured by DSC, of about 50° C. to about 120° C.

\* \* \* \* \*